United States Patent
Niu et al.

(10) Patent No.: US 6,760,196 B1
(45) Date of Patent: Jul. 6, 2004

(54) MICROACTUATOR WITH OFFSETTING HINGES AND METHOD FOR HIGH-RESOLUTION POSITIONING OF MAGNETIC READ/WRITE HEAD

(75) Inventors: Yimin Niu, Fremont, CA (US); Edmund Bruno Fanslau, Jr., San Jose, CA (US)

(73) Assignee: Western Digital, Inc., Fremont, CA (US)

( * ) Notice: Subject to any disclaimer, the term of this patent is extended or adjusted under 35 U.S.C. 154(b) by 271 days.

(21) Appl. No.: 10/016,027

(22) Filed: Dec. 12, 2001

(51) Int. Cl.[7] .............................. G11B 5/55; G11B 5/596
(52) U.S. Cl. .............................. 360/294.6; 360/294.4; 360/245
(58) Field of Search .................... 360/294.6, 294.4, 360/294.1, 245.3, 245.1, 245, 245.6, 246.7, 264.5, 78.05

(56) References Cited

U.S. PATENT DOCUMENTS

| | | | | |
|---|---|---|---|---|
| 5,521,778 A | * | 5/1996 | Boutaghou et al. | 360/264.5 |
| 5,768,062 A | * | 6/1998 | Anderson et al. | 360/245.9 |
| 5,898,541 A | | 4/1999 | Boutaghou et al. | 360/109 |
| 5,969,904 A | * | 10/1999 | Alt et al. | 360/245.4 |
| 5,982,585 A | * | 11/1999 | Fan et al. | 360/294.6 |
| 6,069,771 A | * | 5/2000 | Boutaghou et al. | 360/294.4 |
| 6,078,473 A | * | 6/2000 | Crane et al. | 360/294.3 |
| 6,118,637 A | | 9/2000 | Wright et al. | 360/294.1 |
| 6,122,149 A | * | 9/2000 | Zhang et al. | 360/294.5 |
| 6,198,606 B1 | * | 3/2001 | Boutaghou et al. | 360/294.3 |
| 6,215,629 B1 | * | 4/2001 | Kant et al. | 360/290 |
| 6,222,706 B1 | * | 4/2001 | Stefansky et al. | 360/294.5 |
| 6,246,552 B1 | | 6/2001 | Soeno et al. | 360/294.4 |
| 6,351,353 B1 | * | 2/2002 | Sluzewski et al. | 360/294.3 |
| 6,351,354 B1 | * | 2/2002 | Bonin | 360/294.6 |
| 6,359,758 B1 | * | 3/2002 | Boutaghou | 360/294.4 |
| 6,360,035 B1 | * | 3/2002 | Hurst et al. | 385/18 |
| 6,376,964 B1 | * | 4/2002 | Young et al. | 310/311 |
| 6,501,623 B1 | * | 12/2002 | Sassolini et al. | 360/245.3 |
| 6,549,374 B1 | * | 4/2003 | Ikeda et al. | 360/245.3 |
| 6,549,375 B1 | * | 4/2003 | Crane et al. | 360/245.3 |
| 6,600,634 B1 | * | 7/2003 | Kim et al. | 360/294.5 |
| 6,624,984 B2 | * | 9/2003 | Lewis et al. | 1/1 |
| 6,633,458 B2 | * | 10/2003 | Wu et al. | 360/294.4 |

OTHER PUBLICATIONS

Wei Guo et al. "Dual–Stage Servo System With Microactuated Head Gimbal Assemblies," Journal of Information Storage and Processing Systems, vol. 2, pp. 101–108, 2000.

* cited by examiner

Primary Examiner—Brian E. Miller

(57) ABSTRACT

A microactuator comprised of a piezoelectric motor mounted on a flexure tongue with offsetting hinges, to perform a fine positioning of the magnetic read/write head. The substantial gain in the frequency response greatly improves the performance and accuracy of the track-follow control for fine positioning. The simplicity of the enhanced microactuator design results in a manufacturing efficiency that enables a high-volume, low-cost production.

33 Claims, 17 Drawing Sheets

MICROACTUATOR WITH OFFSETTING HINGES AND METHOD FOR HIGH-RESOLUTION POSITIONING OF MAGNETIC READ/WRITE HEAD

FIELD OF THE INVENTION

The present invention relates in general to data storage systems such as disk drives, and it particularly relates to a read/write head, such as a thin film head, a MR head, or a GMR head for use in such data storage systems. More specifically, the present invention provides a novel design of a microactuator, such as a piezoelectric microactuator, for use in conjunction with a flexure tongue with offsetting hinges, to perform a fine positioning of the magnetic read/write head. The substantial gain in the frequency response bandwidth greatly improves the performance and accuracy of the track-follow control for fine positioning. Furthermore, the simplicity of the enhanced microactuator design results in a manufacturing efficiency that enables a high-volume, low-cost production.

BACKGROUND OF THE INVENTION

In a conventional magnetic storage system, a magnetic head includes an inductive read/write transducer mounted on a slider. The magnetic head is coupled to a rotary voice coil actuator assembly by a suspension over a surface of a spinning magnetic disk.

In operation, a lift force is generated by the aerodynamic interaction between the magnetic head and the spinning magnetic disk. The lift force is opposed by equal and opposite spring forces applied by the suspension such that a predetermined flying height (or fly height) is maintained over a full radial stroke of the rotary actuator assembly above the surface of the spinning magnetic disk. The flying height is defined as the spacing between the surface of the spinning magnetic disk and the lowest point of the slider assembly.

One objective of the design of magnetic read/write heads is to obtain a very small flying height between the read/write element and the disk surface. By maintaining a flying height close to the disk, it is possible to record short wavelength or high frequency signals, thereby achieving high density and high storage data recording capacity.

The slider design incorporates an air bearing surface to control the aerodynamic interaction between the magnetic head and the spinning magnetic disk thereunder. Air bearing surface (ABS) sliders used in disk drives typically have a leading edge and a trailing edge at which read/write heads are deposited. Generally, the ABS surface of a slider incorporates a patterned topology by design to achieve a desired pressure distribution during flying. In effect, the pressure distribution on the ABS contributes to the flying characteristics of the slider that include flying height, pitch, and roll of the read/write head relative to the rotating magnetic disk.

In a conventional magnetic media application, a magnetic recording disk is comprised of several concentric tracks onto which magnetization bits are deposited for data recording. Each of these tracks is further divided into sectors where the digital data are registered.

As the demand for large capacity magnetic storage continues to grow, the current trend in the magnetic storage technology has been proceeding toward a high track density design of magnetic storage media. In order to maintain the industry standard interface, magnetic storage devices increasingly rely on reducing track width as a means to increase the track density without significantly altering the geometry of the storage media.

A smaller track width poses several mechanical and electrical problems to the operation of magnetic disk drives. One such problem lies in its actuation and control feature, which is critical to the operation of a magnetic disk drive. In order to appreciate the magnitude of this problem, it might be important to further describe the control aspect of a conventional magnetic read/write head.

In a conventional magnetic disk drive, a read/write head includes a transducer mounted on a slider. The slider is in turn attached to a stainless steel flexure. The flexure and the load beam to which the flexure is attached, form a suspension arm. The suspension arm is connected to one distal end of an actuator arm, which is driven by a voice coil motor (VCM) at the other distal end, to cause it to rotate at its mid-length about a pivot bearing.

The suspension arm exerts an elastic force to counteract the aerodynamic lift force generated by the pressure distribution on the ABS of the slider. The elastic force together with the stiffness of the suspension arm controls the stability of the actuator arm with respect to the pitch, roll, and yaw orientations. With respect to the control feature of the magnetic disk drive, during each read or write operation, there are usually two types of positioning controls: a track-seek control and a track-follow control.

A track-seek and follow control is typically commanded when data are to be retrieved from, or new data are to be written to a particular sector of a data track. Electronic circuitry incorporating an embedded feedback control software, supplies a necessary voltage to the VCM to actuate the VCM to drive the actuator arm, to which the read/write head is attached, to a target track. Thus, a track-seek control performs a low-resolution or coarse positioning of the read/write head from one data track to another data track and also following track of corresponding track pitch density Upon the completion of a track-seek control, subsequent data operation is typically confined to within the target track. In the earlier stage of the magnetic storage technology, a typical data track is sufficiently wide so that small variations in the position of the read/write head resulting from external disturbances to the track-seek control plant do not cause the position of the read/write head to exceed the prescribed control error allowance.

As the track width reduces as a means to increase the track density and hence the storage capacity of magnetic disk drives, the foregoing single-stage actuation design encounters a significant degree of difficulty, mainly due to the excessive control error of the track-seek control using the VCM. In particular, a single-stage actuation using the VCM is found to be inadequate because the resulting control error due to external disturbances, such as inertial shock loading or noise sometimes, could cause the read/write head to be positioned over tracks that are adjacent to the target track, thus possibly causing a magnetic field disturbance of the existing data thereon.

In a worst case scenario, the data disturbances can result in a total erasure of data in the adjacent tracks after several repetitive write operations, or data corruption upon reading. Moreover, the VCM employed in a single-stage actuation is typically subjected to a mechanical resonance at the lowest natural frequency in the range of 2000 Hz–6000 Hz due to the flexibility of the actuator arm and followed by frequencies on the suspension arm in the range of 2 kHz–15 kHz.

The response of the servo-system further limits the frequency bandwidth to less than 1500 Hz. As a result, this low frequency bandwidth imposes a severe penalty on the single-stage actuation system in such a manner that the track-seek and track-follow control is unable to rapidly and precisely respond to a change in the position of the read/write head, thus causing a significant degradation in the performance of the magnetic disk drive.

To address this technical concern, it is recognized that in order to maintain the position of the read/write head in a manner that it follows a concentric path within a narrow track width of the target data track, necessary corrections to the motion of the actuator arm are required. This provision is made possible by a enhanced track-follow control, which uses a feedback on the position error signal (PES) to make an appropriate correction to the motion of the actuator arm, so as to have the position of the read/write head follow a concentric path of the target data track within a prescribed control error allowance.

Thus, in the presence of external disturbances, variations in the position of the read/write head would not cause the position of the read/write head to significantly deviate from the target position in excess of the control error allowance. To implement this track-follow control plant, a microactuator is frequently incorporated in the control feedback loop.

Various types of microactuator have been proposed, including piezoelectric (PZT) actuators, electrostatic micro-electrical mechanical systems (MEMS), and electromagnetic microactuators. By adjusting the voltage supplied to the microactuator, the track-follow control makes necessary corrections to the position of the actuator arm in the presence of external disturbances, so that the read/write head follows the target data track with a predetermined degree of precision.

The implementation of a microactuator-based high-resolution positioning in addition to the usual VCM- based single-stage actuation, is referred to as a dual-stage servo system, which is still under intensive research and development. At the time of this application is made, the microactuator-based dual stage servo systems have not been used in commercially sold drives.

A high-resolution positioning could include a rotating flexure design, and a piezoelectric rotary motor with virtual pivot. In principle, a rotating flexure design utilizes the physical properties of the piezoelectric material to convert a translational elongation or contraction of the piezoelectric material under an applied voltage to cause a distortion, which, in turn, induces a rotation of the stainless steel flexure and the hence slider that contains (or supports) the read/write head.

Notwithstanding the ability to achieve the track-follow control objective, these microactuator designs suffer from significant shortcomings among which are the following:

In certain rotating flexure microactuator designs, the piezoelectric material is arranged in a flexure beam configuration such as a cantilever. During a track-follow control actuation, the flexural (bending) deflection is converted into distortion, which causes a rotation of the flexure.

However, in relying on the flexural deflection, the piezoelectric would possess some natural modes of vibration at low frequencies, which could be easily excited by a sudden motion as commanded by the track-follow control. To minimize this excitation force, the track-follow control may command a more gradual motion to reduce the inertial force loading. In so doing, the track-follow control performance may be significantly compromised.

Still another concern with certain conventional or proposed microactuator designs, is the application of the piezoelectric material in a complex pattern. This patterning technology of the piezoelectric material has not yet reached a level of maturity with respect to manufacturing efficiency that is conducive to a high-volume, low-cost production.

As presented earlier, certain conventional rotating flexure microactuator designs rely on flexural deflections of the piezoelectric material to cause the flexure/slider assembly to rotate. This rotation is dependent upon the motion of the piezoelectric material, also known as stroke. In some instances, an amplification device is also incorporated into the design of piezoelectric material in order to effect a sufficient stroke requirement to enable the microactuator to achieve the full range of rotation of the slider. The additional amplification requirement further complicates the slider design, hence resulting in an added cost.

Yet another problem associated with a conventional microactuator design lies in the piezoelectric material itself. The output force induced by the piezoelectric material often can be substantially large that it may present itself as an excitation force to the suspension arm assembly, which typically possesses low natural frequencies. Thus, if the output force is not properly controlled, a resonance vibration of the suspension arm assembly would ensue, thereby causing an undesirable disturbance problem for the track-follow control system.

It is recognized that a further enhancement in the microactuator design for a fine positioning of the read/write head is beneficial to manufacturability, reliability and performance. Preferably, the enhanced microactuator would provide all the advantages afforded by the track-follow control system, but with a design that does not rely on a flexural arrangement of the piezoelectric material.

Furthermore, the enhanced design would achieve a controlled piezoelectric output force, and the stroke requirement without the necessity for amplification. Moreover, the enhanced microactuator design should incorporate a relatively simple piezoelectric arrangement that does not require patterning technology that typically increases the manufacturing efficiency and reduces the production cost.

SUMMARY OF THE INVENTION

It is a feature of the present invention to provide a novel enhanced microactuator for fine positioning of the read/write head during a track-follow control operation. The enhanced microactuator according to the present invention is designed to be used in a collocated dual-stage actuation servo system that substantially boosts the servo frequency bandwidth to enhance the track-seek and track-follow controls for high capacity magnetic storage device.

According to a preferred embodiment, the present invention features a novel application of piezoelectric motors in the form of a monolithic block that is suitable for low cost and manufacturing efficiency. The piezoelectric monolithic motor can be either a bulk or multi-layer type that is sandwiched between the flexure tongue and the slider. The piezoelectric motor is bonded to two hinged islands on the flexure tongue on one side, while the other side is bonded to the slider top surface.

The longitudinal axes of the hinges to which the piezoelectric motor is bonded, are further separated by an appropriate offset distance that is perpendicular to the longitudinal axis of the piezoelectric motor. A control signal commands a voltage to be supplied to the piezoelectric motor, thus causing it to either expand or contract in accordance with the voltage polarity. The equal, but opposite longitudinal forces developed within the offsetting hinges, due to the elongation or contraction of the piezoelectric motor, results in a torque that causes the piezoelectric motor as well as the slider to displace in a clockwise or counterclockwise rotation about the axis which passes through the dimple and is perpendicular to slider ABS.

Such resulting rotation demonstrates several important features for this invention, among which is that the pure resultant torque developed by the piezoelectric motor causes virtually no excitation of any load beam and flexure modes, thereby improving the accuracy of the track-follow control.

Another feature of the present invention lies in the design of the offset distance between the two hinges of the flexure. The offset distance can be adjusted to achieve simultaneously a high stroke sensitivity and a force limitation, in order to further prevent mechanical excitation of the suspension arm assembly.

Various alternative embodiments can be derived from the implemented according to the present invention. One such alternative embodiment includes two piezoelectric motors bonded to a flexure having two hinges. The two piezoelectric motors may be placed along the length or width of the slider, and may be confined within, or may extend beyond the footprint of the slider.

Still another alternative embodiment utilizes multiple piezoelectric motors (e.g., three or more) that are arranged in a circumferential configuration, such that the longitudinal axes (or force centers) of the piezoelectric motors are offset from the circular center, to impart the desired rotation.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
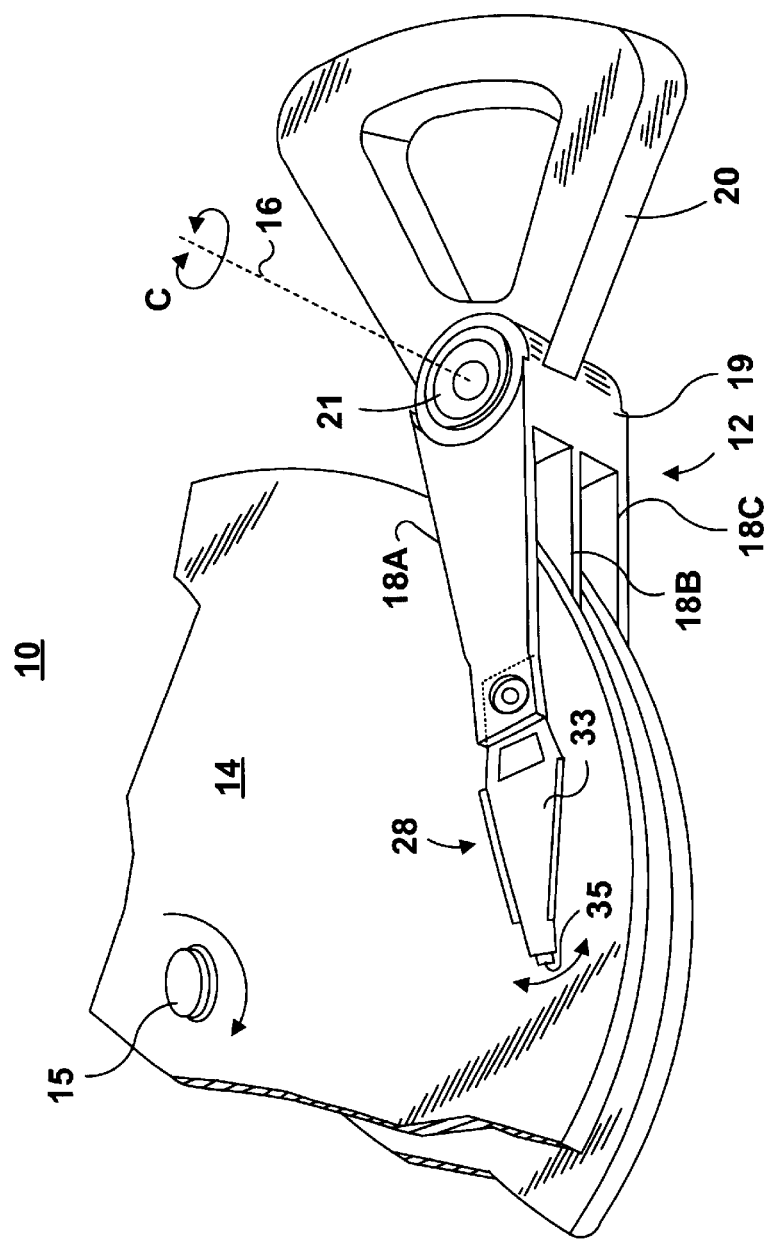
FIG. 1 is a fragmentary perspective view of a data storage system including the head gimbal assembly, made according to a preferred embodiment of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor or voice coil motor (VCM) 20 attached to the block 19 in a position diametrically opposite to the actuator arms 18A, 18B, 18C. The VCM cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

The actuator arms 18A, 18B, 18C are generally similar in design and geometry. Therefore, only one of these actuator arms, 18A, is further referenced herein, with the understanding that this reference also applies to the plurality of the actuator arms 18A, 18B, 18C. According to a preferred embodiment of the present invention, a head gimbal assembly (HGA) 28 is secured to each of the actuator arms, for instance 18A.

Figure 2:
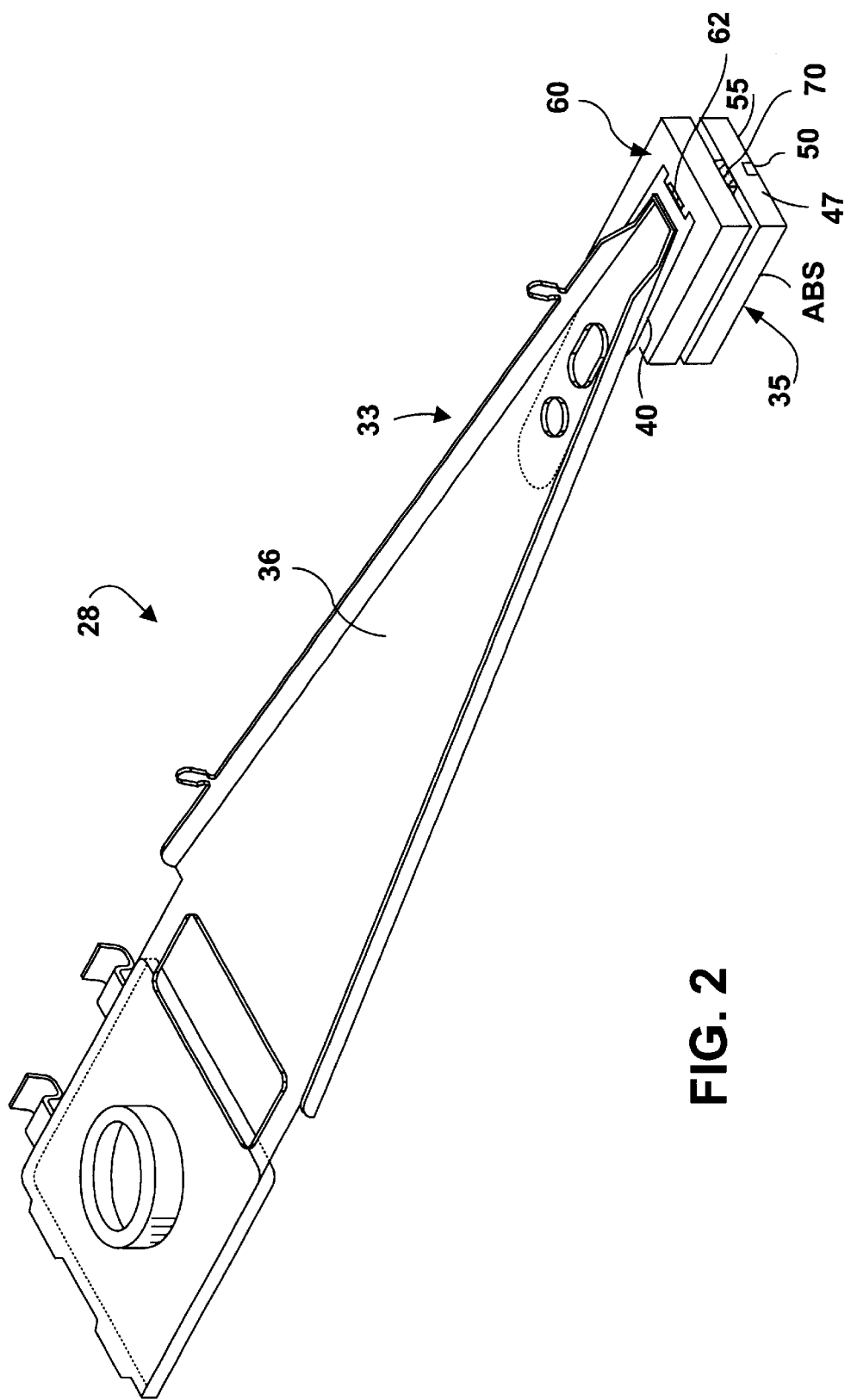
FIG. 2 is a perspective top view of the head gimbal assembly of FIG.1 comprised of a suspension, a slider, adhesive pads, and a piezoelectric motor, made according to the preferred embodiment of the present invention.
Figure 3:
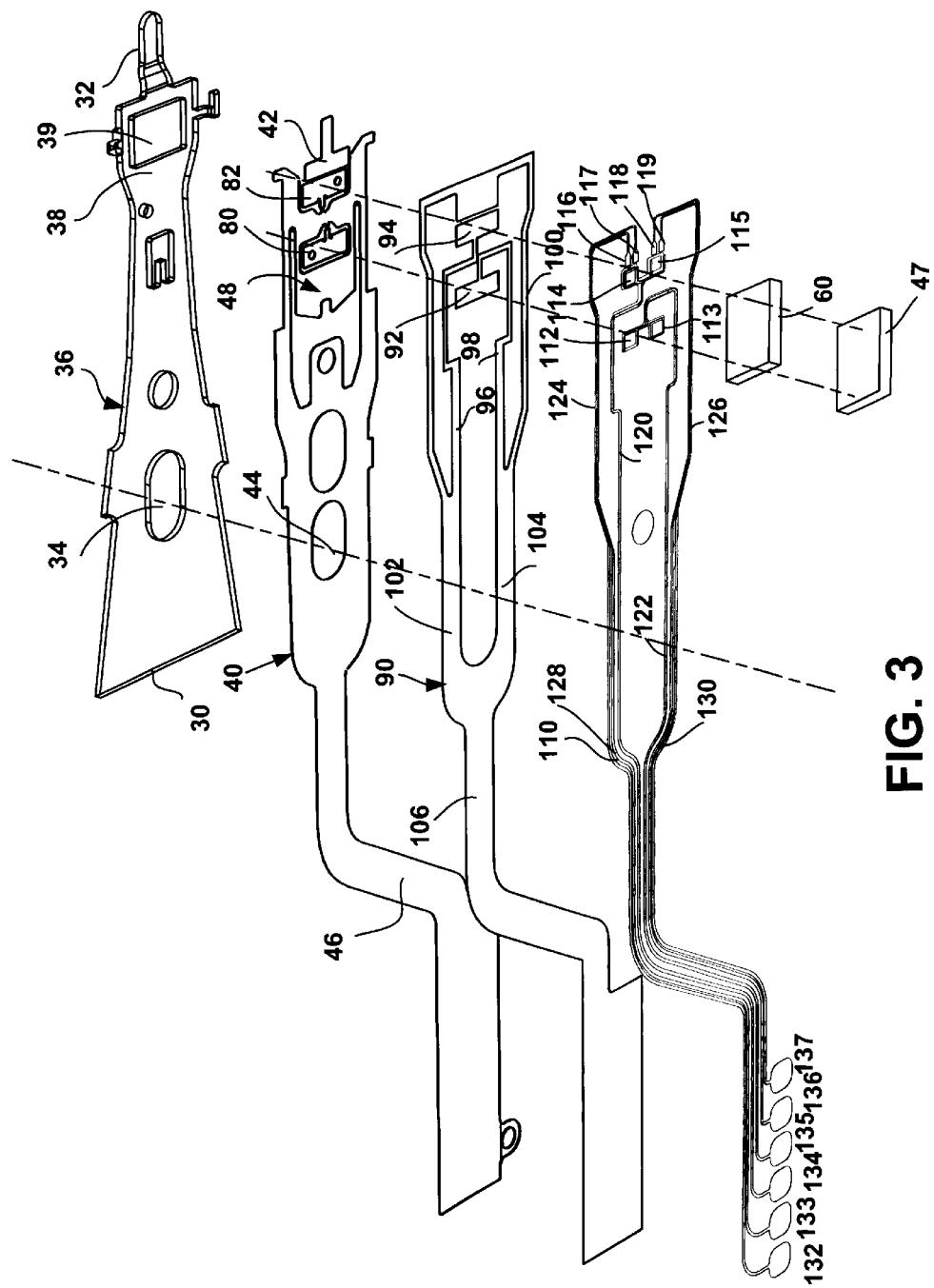
FIG. 3 is an exploded view of the head gimbal assembly of FIG. 2, illustrating a load beam, a flexure, a dielectric layer, a copper trace, a piezoelectric motor, and a slider.
Figure 4:
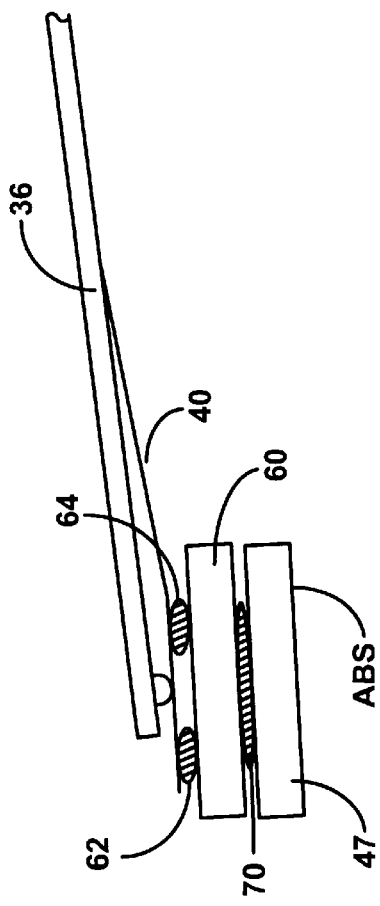
FIG. 4 is a side view of the head gimbal assembly of FIG. 2, made according to a preferred embodiment of the present invention.

With reference to FIGS. 2 through 4, the HGA 28 includes a suspension 33, a piezoelectric motor 60 of the present invention, and a read/write head 35. The suspension 33 includes a load beam 36 and a flexure 40. The top surface of the piezoelectric motor 60 is bonded to the flexure 40 by means of adhesive pads 62 and 64 (FIG. 4), and to a read/write head 35 on its underside via an adhesive pad 70.

The read/write head 35 is formed of a slider 47 that is secured to the piezoelectric motor 60, and a read/write transducer 50 that is supported by the slider 47. The read/write element 50 is mounted at the trailing edge 55 of the slider 47 so that its forwardmost tip is generally flush with the air bearing surface (ABS) of the slider 47.

With more specific reference to FIG. 3, the load beam 36 is generally flat and has an elongated shape with a taper width. The load beam 36 can assume a conventional design, with various features provided therein in the form of protuberances and cutouts that are positioned through the load beam 36 to provide connections to the flexure 40 and the actuator arm 18A. These features include, for example, a lift tab 32 and an elliptical alignment slot 34. The load arm 36 is connected to the actuator arm 18A by swaging the base plate to it. With reference to FIG. 3, the flexure 40 is made of stainless steel and is generally flat with an elongated shape. A number of protuberances and cutouts are made throughout the flexure 40, such as a flexure tongue 48, a T-shaped forward tab 42 and an elliptical alignment slot 44. A serpentine strip 46 extends the main body of the flexure 40 to provide a surface onto which a dielectric material is deposited, conductive traces are routed, and termination pads are supported.

The flexure 40 is affixed to the underside of the load beam 36 by means of spots welding. The flexure 40 is positioned relative to the load beam 36 in a manner such that the alignment slots 34 and 44 of the load beam 36 and the flexure 40, respectively, are coincident.

The flexure 40 includes the flexure tongue 48, which, according to a preferred embodiment, has a generally rectangular shape, and is located in the forwardmost region of the flexure 40 adjacent to the T-shaped forward tab 42.

The flexure tongue 48 incorporates various novel features, including two substantially rectangular hinged islands 80 and 82 designed to provide means for pivotally securing the piezoelectric motor 60 to the slider 47. The details of the flexure tongue 48 will be further described in connection with FIGS. 5 to 10.

In connection with FIG. 3, a dielectric layer 90 is attached to the underside of the flexure 40. The dielectric layer 90 is composed of a conventional dielectric material such as polyimide, to provide electrical insulation for the stainless steel flexure 40 and conductive traces 110. The dielectric layer 90 is formed on the underside of the flexure 90 by a CIS deposition method.

The dielectric layer 90 provides a layout for the electrical path to the read/write transducer 50 and piezoelectric motor 60 to be secured thereto. Two rectangular dielectric pads 92 and 94 of the dielectric layer 90 are formed onto, or secured to the two hinged islands 80 and 82 of the flexure tongue 48, respectively.

The dielectric inner paths 96 and 98 are routed away from the forwardmost region of the dielectric layer 90 and merged with a narrow outer path loop 100 into two larger main paths 102 and 104, respectively. The two main paths 102 and 104, in turn, merge into a serpentine path 106, which conforms to the serpentine strip 46 of the flexure 40.

As further illustrated in FIG. 3, a conductive trace, such as a copper trace 110, is deposited onto the underside of the dielectric layer 90. The copper trace 110 provides the electrical connection to the read/write transducer 50 and piezoelectric motor 60, and generally conforms to the layout of the dielectric layer 90. The copper trace 110 is comprised of six separate electrical wiring paths 120, 122, 124, 126, 128, and 130. These respective wiring paths terminate on one distal end at six corresponding termination pads 132, 133, 134, 135, 136, and 137.

The two inner electrical wiring paths 120 and 122 connect at their other distal ends to two pair of rectangular electrical wiring loops 112, 113, and 114, 115, respectively. The wiring loops 113 and 114 supply the electrical signal to the piezoelectric motor 60 The four outer electrical wiring paths 124, 126, 128, and 130 connect at their other distal ends to four termination pads 116, 117, 118, and 119 for reading and writing information to and from the storage media.

Figure 5:
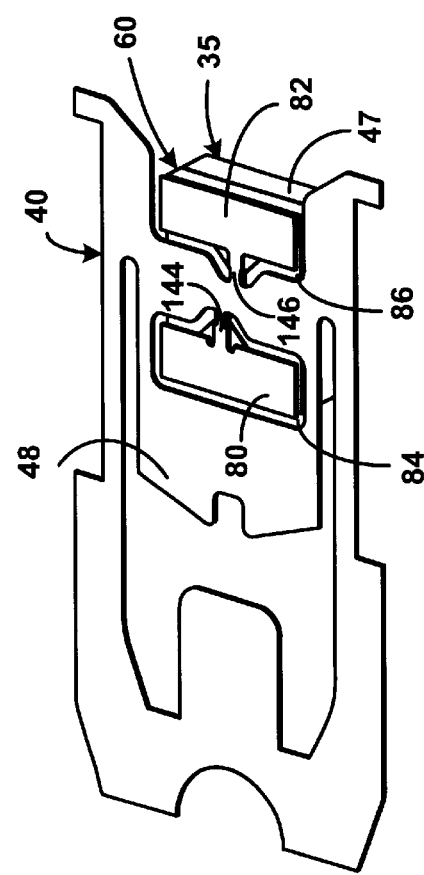
FIG. 5 is an enlarged, perspective view of the flexure shown secured to the piezoelectric motor and slider of FIG. 4.
Figure 6:
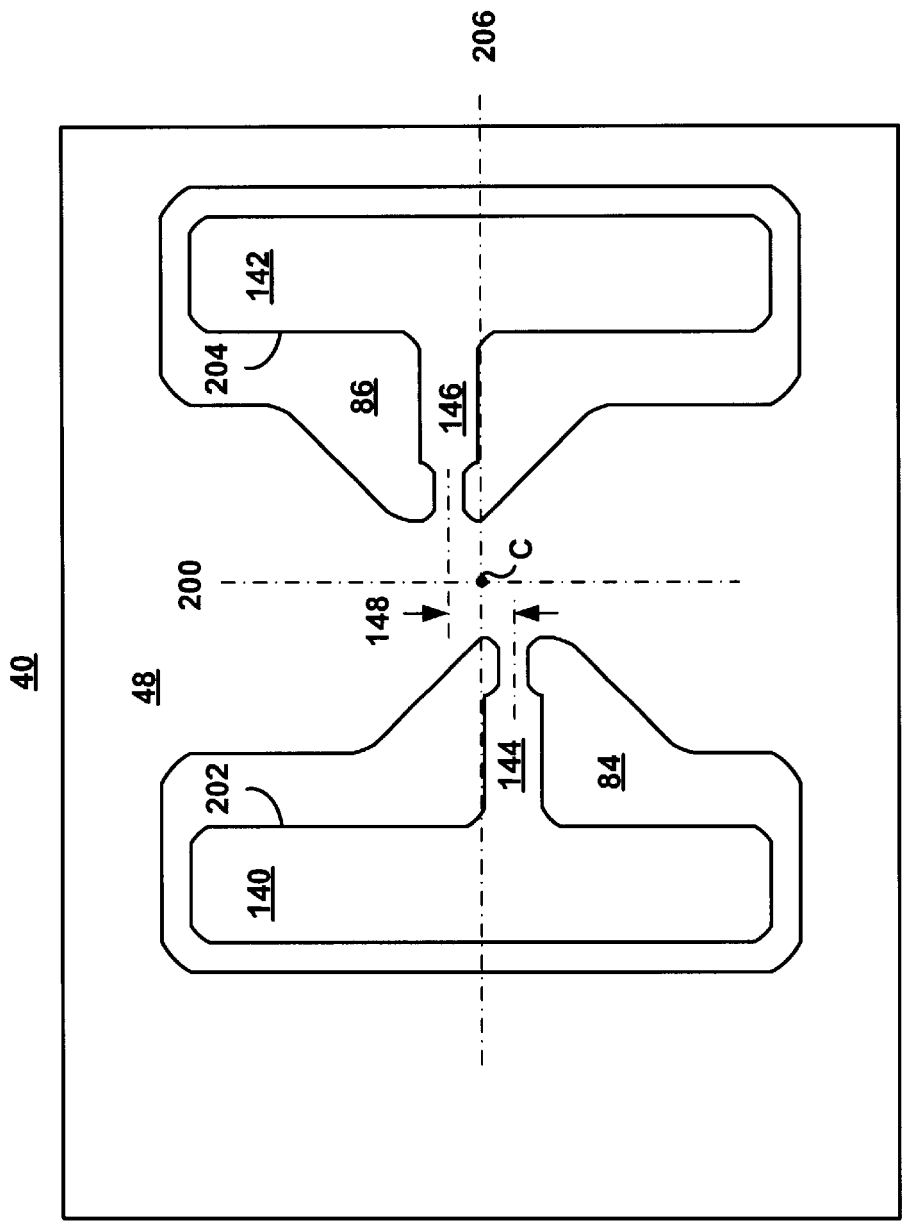
FIG. 6 is an enlarged, schematic illustration of a bottom view of a flexure tongue of the head gimbal assembly of FIGS. 2, 4, and 5, illustrating two adhesive pads bonded to two hinged islands of the flexure tongue that are made according to a preferred embodiment of the present invention.

Referring now to FIGS. 5 and 6, the tongue 48 of the flexure 40 has a substantially rectangular shape, and is located in the forwardmost region of the flexure 40. The flexure tongue 48 includes two hinged islands 80 and 82 that are formed by, and separated from the main body 85 of the flexure tongue 48 by two narrow gaps 84 and 86, respectively.

The gaps 84 and 86 are generally similar in design, and have the shape of the letter G, to enclose the hinged islands 80 and 82 in part. The dimensions of the gaps 84, 86 are such that they allow free motion (mainly rotation) of the hinged islands 80 and 82 therewithin.

As more clearly illustrated in FIG. 6, the hinged islands 80 and 82 are generally disposed opposite to each other relative to a center of symmetry C, at which a transverse axis 200 and a longitudinal (or axial) axis 206 intersect. In FIG. 6, the flexure tongue is schematically represented by a rectangular borderline, to simplify the description of the hinged islands 80 and 82. The hinged islands 80 and 82 are defined by two tabs (or paddles) 140 and 142, and two elongated hinges 144 and 146, respectively. Though the tabs 140 and 142 are shown to be generally rectangularly shaped, it should be clear that they can assume any other suitable shape.

The tabs 140 and 142 are similar in shape and construction, and provide bonding surfaces for attaching the piezoelectric motor 60 (FIG. 5) by means of the adhesive pads 62 and 64 (FIG. 4), respectively. In the embodiment illustrated herein, the tabs 140 and 142 are generally oriented along the transverse axis (or direction) 200, and have the following approximate dimensions: 1 mm in length and 0.3 mm in width.

The tabs 140 and 142 are further separated by a distance of approximately 0.7 mm, from the inner edge 202 of the tab 140 to the inner edge 204 of the tab 142. The two hinges 144 and 146 are formed of thin, short, substantially shouldered (stepped) rectangular sections that protrude from the inner edges 202 and 204 of the tabs 140 and 142, respectively, and generally extend along the longitudinal axis 206 of the flexure 40.

A novel feature of the preferred embodiment of the present invention is an offset 148 of the two hinges 144 and 146 relative to each other, along the longitudinal direction. The advantages of the offset hinges 144 and 146 will be described later in greater detail in connection with FIGS. 10 to 12. The offset 148 may be defined, for example, as the distance between the axes of symmetry of the hinges 144 and 146. It should also be understood that the offset 148 can be defined in term of distances between opposite sides of the hinges 144, 146 along the transverse axis 200.

Figure 7:
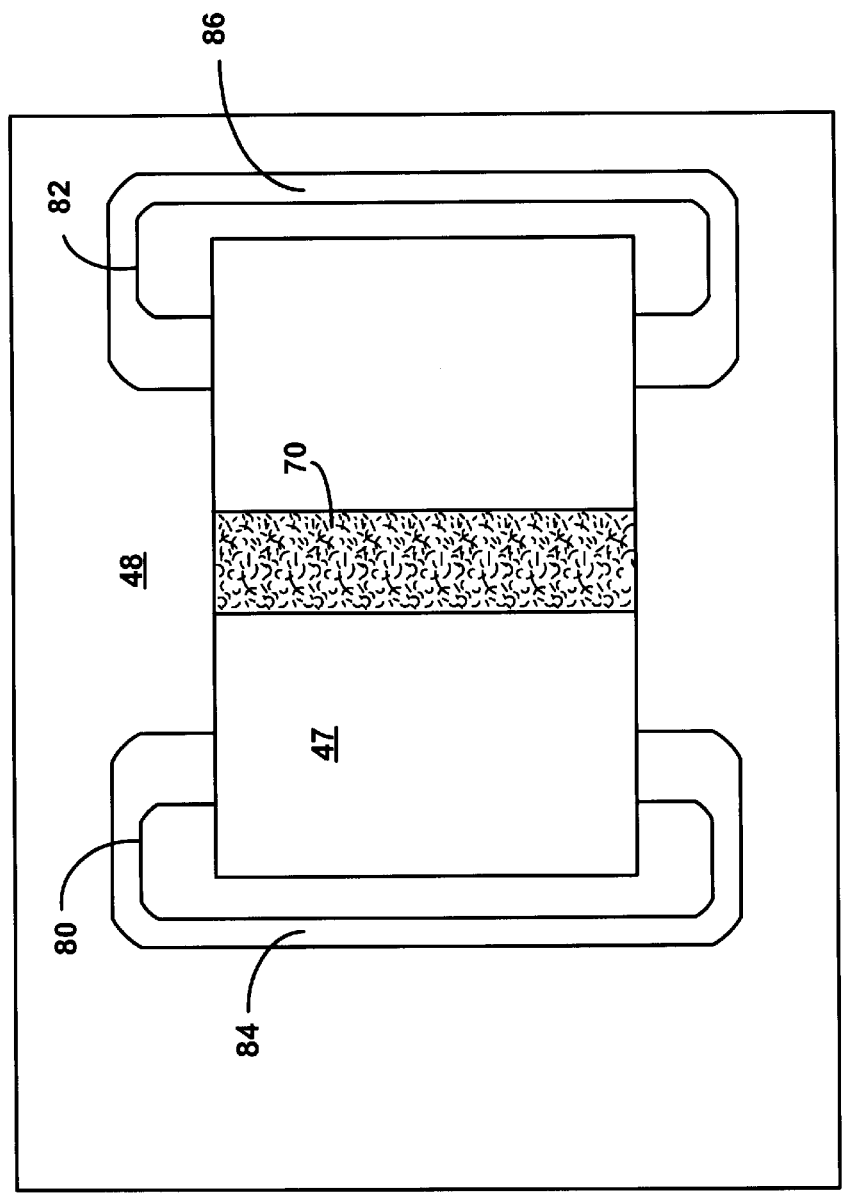
FIG. 7 is a bottom view of the piezoelectric motor shown bonded to the flexure tongue and an adhesive pad, for bonding the slider of the head gimbal assembly of FIG. 2 to the piezoelectric motor.
Figure 8:
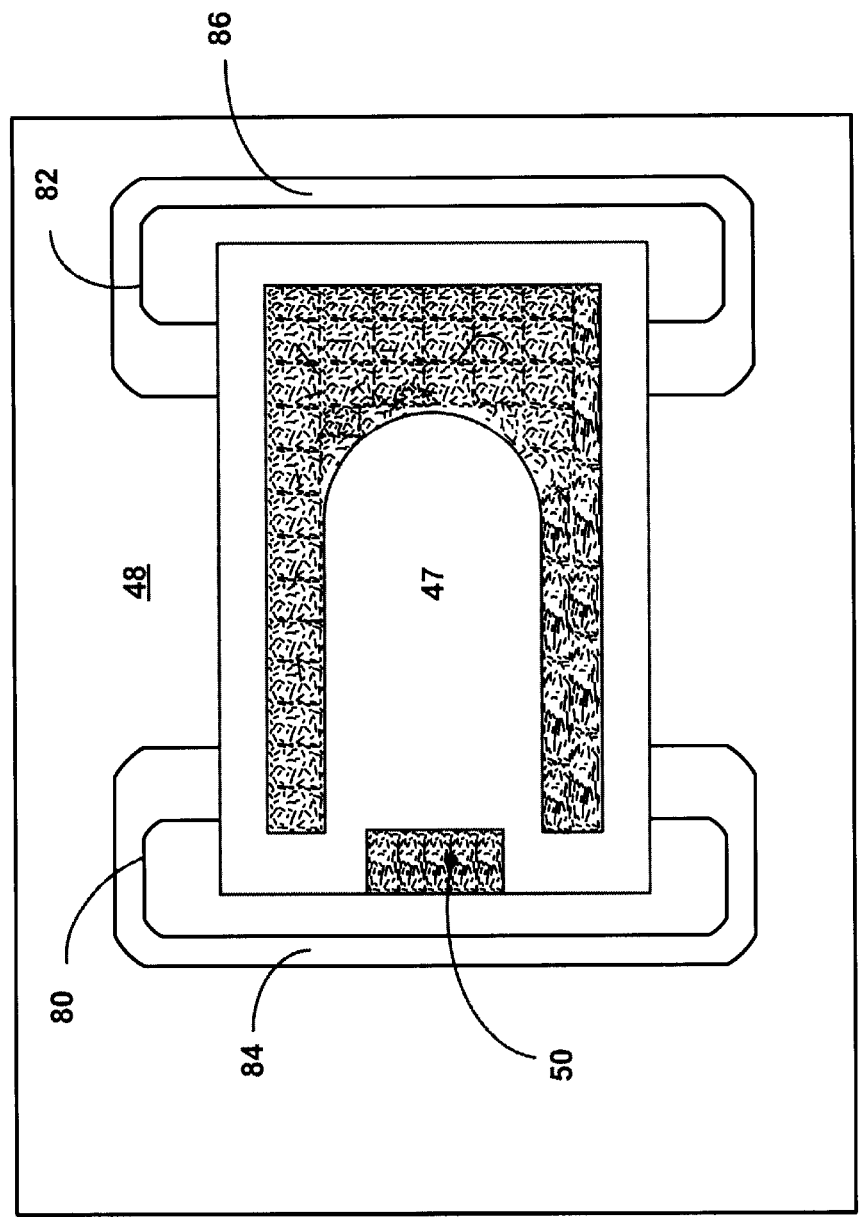
FIG. 8 is a bottom view of the slider shown bonded to the piezoelectric motor of FIG. 3.

With reference to FIGS. 7 and 8, the piezoelectric motor 60 has a generally rectangular shape that is preferably, but not necessarily, similar in dimensions to those of the slider 47. According to a preferred embodiment of the present invention, the dimensions of the piezoelectric motor 60 may be defined by a length of approximately 1.25 mm, a width of approximately 1 mm, and a thickness of approximately 0.2 mm.

The piezoelectric motor 60 is positioned relative to the flexure tongue 48, such as its length extends along the longitudinal axis 206 of the flexure 40. The piezoelectric motor 60 is preferably, but not necessarily made of PZT material or any other similar material, and can be of either a bulk type or a multi-layer type.

A bulk-typed piezoelectric motor 60 is formed by co-firing the molded PZT powers followed by polarization, while a multi-layer typed piezoelectric motor 60 is comprised of a number of stratified sections of piezoelectric material that are superimposed to form a desired thickness of the piezoelectric motor 60.

Reference is made for example, to U.S. Pat. No. 6,246,552 for further composition details.

In certain applications, the multi-layer typed piezoelectric motor 60 is preferred over the bulk-typed piezoelectric motor 60 due to its high stroke sensitivity, because a larger electric field can be generated if voltages are applied to thinner layers, with the stroke being proportional to the electric field. The electrical contacts to the piezoelectric motor 60 are provided by the rectangular pads 113, 114, (FIG. 3), for supplying a controlled voltage as defined by the control system.

The piezoelectric motor 60 is attached to the flexure tongue 48 by means of the adhesive pads 62 and 64 (FIG. 4), which are positioned against the rectangular tabs 140 and 142 of the respective hinged islands 80 and 82. The backside of the slider 47 is then affixed against the bottom surface of the piezoelectric motor 60, by means of an adhesive pad (or pads) 70 (FIG. 7).

The functionality of the preferred embodiment will now be described in connection to FIGS. 9 through 12, in order to provide a clearer appreciation of the advantages afforded by the present invention.

Figure 9:
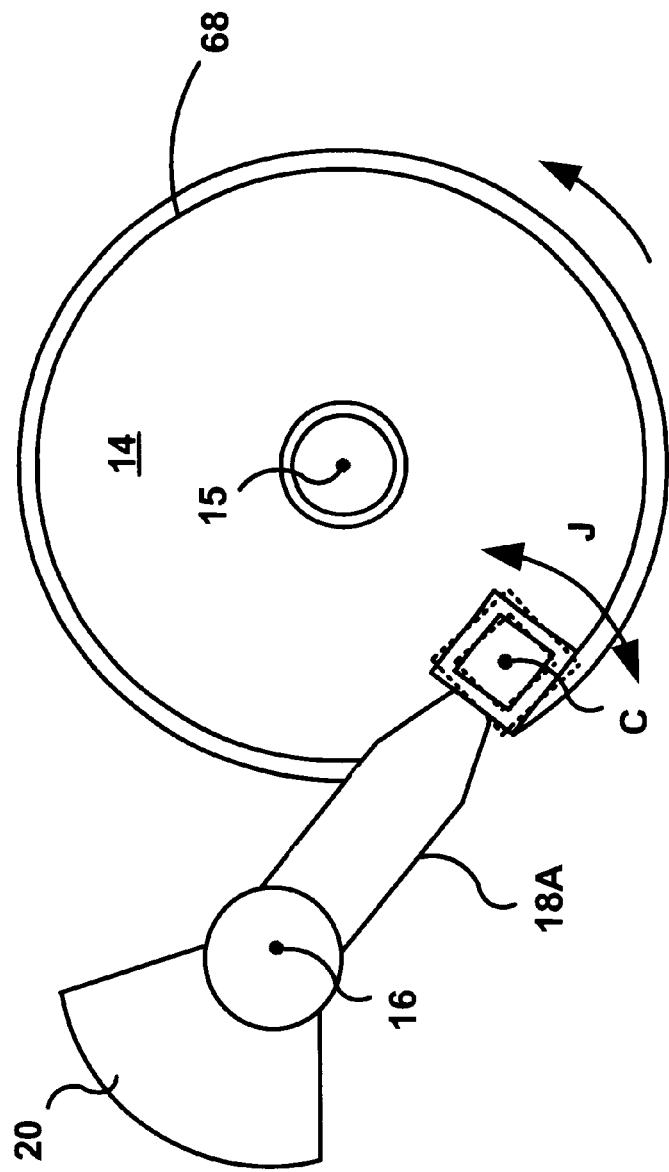
FIG. 9 is a bottom view of the head gimbal assembly of FIG. 2 before and after actuation.

During a track-seek control, the actuator arm 18A is driven by the VCM 20 to provide a coarse positioning of the read/write head 35 by pivoting about a pivot bearing, around the axis 16 (FIGS. 1 and 9). Upon arriving at a desired target data track 68, the track-follow control assumes the primary function of the magnetic disk drive 10 by causing the read/write head 35 to follow the target data track 68 in a high resolution mode, which is also known as fine positioning.

An feedback control system is deployed by means of an embedded logic to enable the track-follow control function. The track-follow control system senses the deviation in the position of the read/write head 35 relative to the track position. A correction is made to reduce this deviation by the track-follow control, which commands a necessary voltage to the piezoelectric motor 60 to cause it to rotate along with the slider 47, thus restoring the desired position of the read/write head 35.

This operation is illustrated in FIG. 9. In particular, FIG. 9 shows that the correction requires a counterclockwise rotation of the slider 47 as viewed from the ABS, with the understanding that a clockwise rotation may alternatively be required as suited for a particular position of the read/write head 35.

Figure 10:
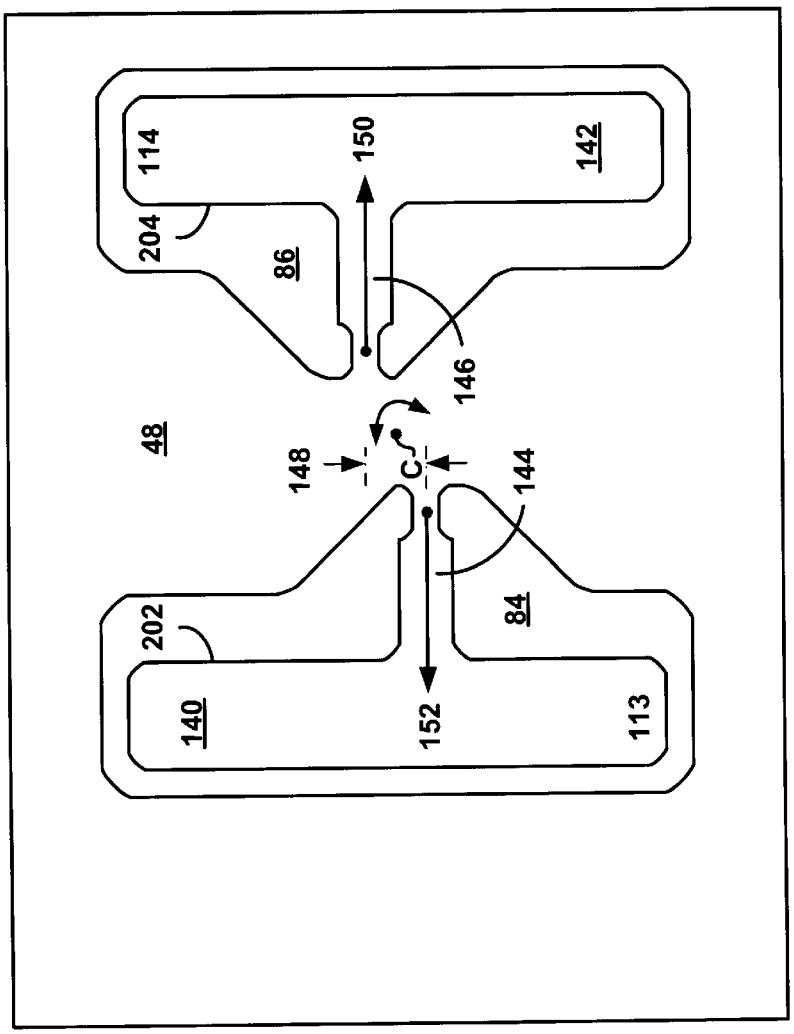
FIG. 10 is a bottom view of the hinges and the piezoelectric motor during a track-follow control actuation, shown with a corresponding force diagram.
Figure 11:
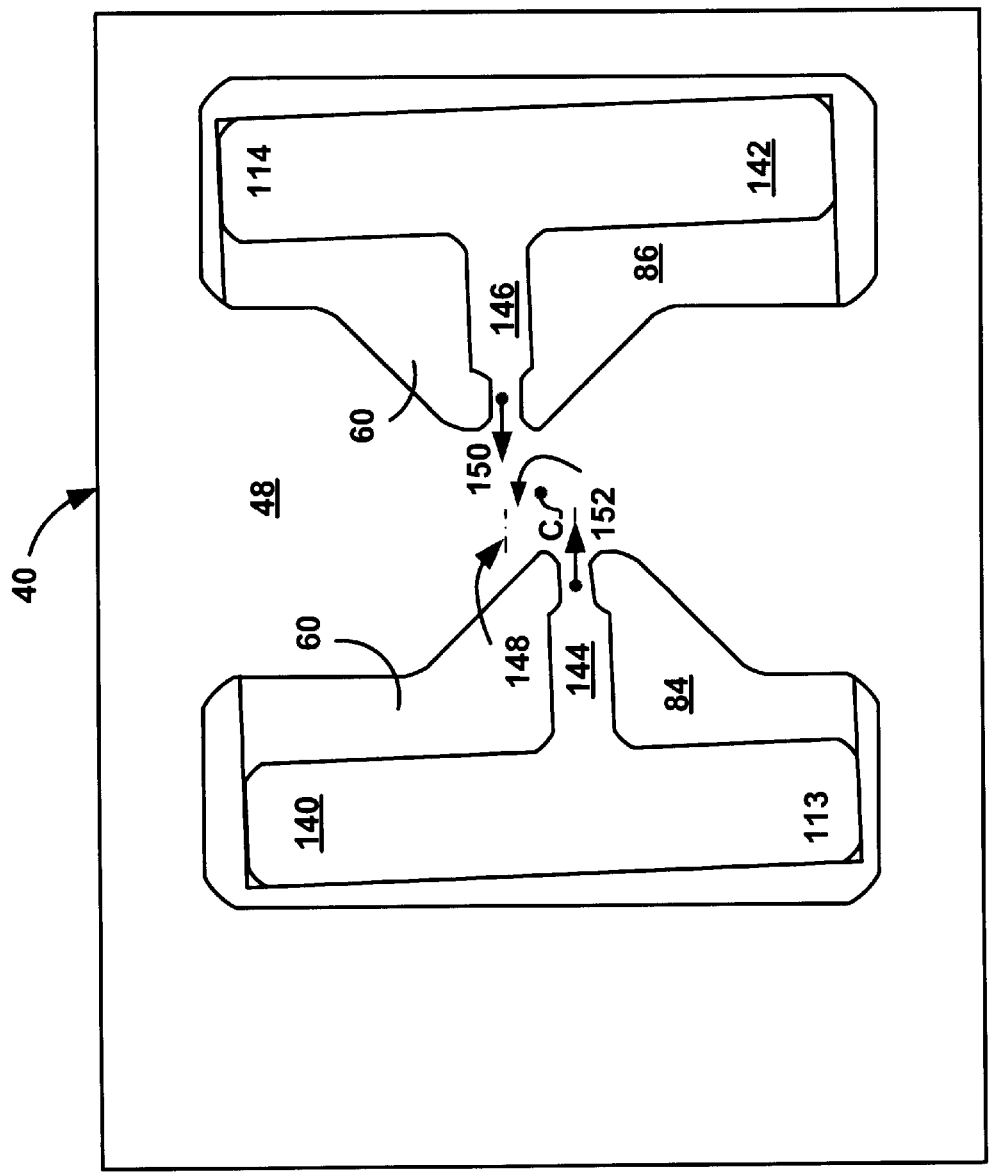
FIG. 11 illustrates a bottom view of the displaced hinges and piezoelectric motor after actuation.
Figure 12:
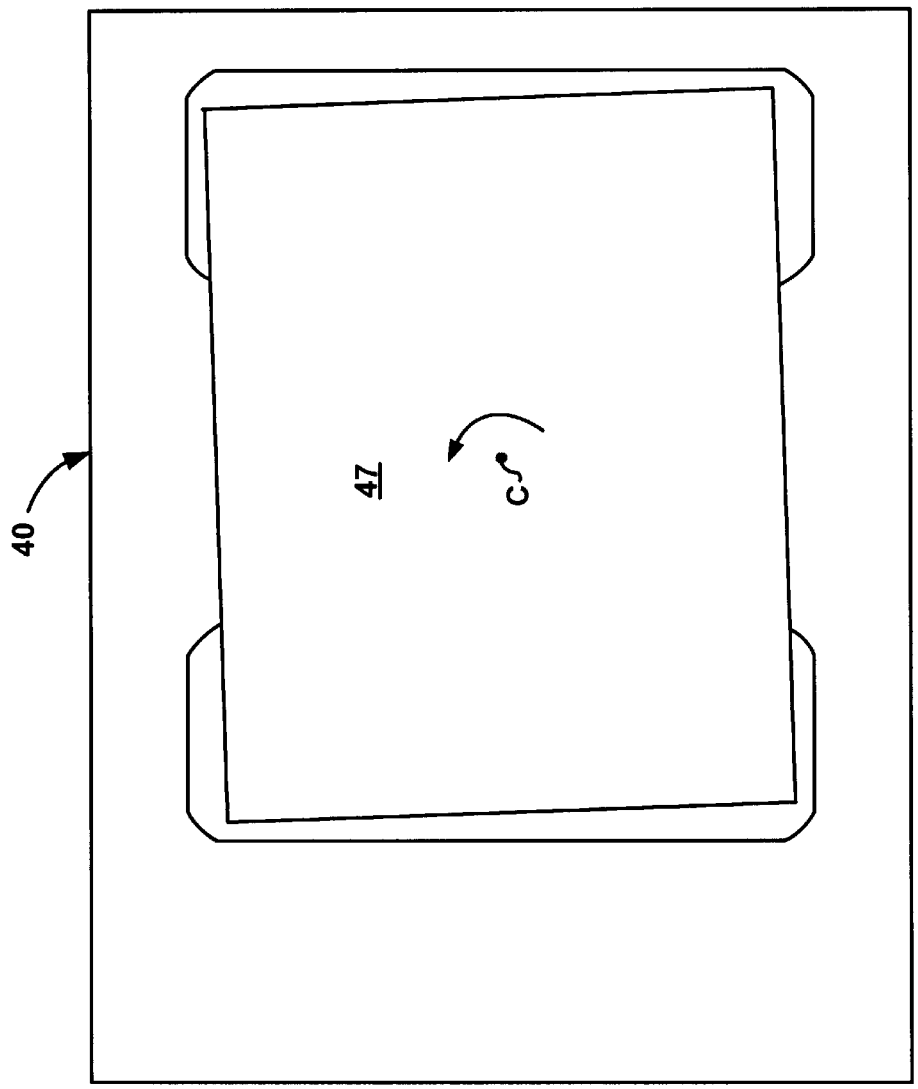
FIG. 12 is an ABS view of the slider of FIG. 3, shown in a rotational movement, secured to the piezoelectric motor of FIG. 11.

With reference to FIGS. 10 through 12, when a control voltage is applied to the piezoelectric motor 60 through the pads 113 and 114 the piezoelectric motor 60 deforms, i.e., changes shape, according to the polarity of the voltage. As the length of the piezoelectric motor 60 elongates, the piezoelectric motor 60 exerts a pull force 150 on each of the two hinges 144 and 146. The pull forces 150 on the two hinges 144 and 146 are substantially equal and opposite in direction, which is also known as a force couple. Since the flexure tongue 48 is largely fixed compared to hinged islands 140 and 142, The force couple 150 causes the hinge 144 and 146 to deflect and rotate the hinged islands 140 and 142 with the motor 60 and the slider attached on it.

A contraction of the piezoelectric motor 60 is also possible by reversing the polarity of the voltage applied to the pads 113 and 114. As used herein, the length of the PZT motor 60 is along the longitudinal axis 206 as shown in FIG. 6) and the width of the motor 60 is along the transverse axis 200. An excitation voltage is applied to the metallization pads on the PZT motor 60, which are in contact with pads 113 and 114 through a conductive adhesive.

The significance of the offset distance 148 is now apparent in the presence of the force couple (150, 152). The forces 150, 152 act along the centerlines of the hinged islands 144, 146. The resultant torque about the center of rotation C of the flexure tongue 48 is created as a manifestation of the force couple (150, 152) acting through the offset distance 148. The amplitude of the resultant torque is equal to the force couple (150, 152) times the offset distance 148.

Thus, by adjusting the offset distance 148 appropriately, a desired sensitivity and stroke requirement can be achieved for the piezoelectric motor 60 without the need for an ancillary amplification. In a preferred embodiment of the present invention, the offset distance 148 is approximately 0.06 mm to provide a sensitivity of 50 nm/V of the read/write transducer 50 along the off-track direction. With reference to FIG. 9, the off-track direction is the direction of the arrow J, and shows the head movement relative to the disc 14.

In a similar manner, the resultant torque can be controlled by simply adjusting the offset distance 148.

With reference to FIG. 12, the resultant torque about the center of rotation C of the flexure tongue 48 acts on the piezoelectric motor 60, to cause it to execute a virtually pure rotation about the center 154 in either the clockwise direction or the counterclockwise direction. Since the slider 47 is bonded to the piezoelectric motor 60 by means of the adhesive 70, the rotation of the piezoelectric motor 60 also results in an accompanied rotation of the slider 47 to allow the read/write element 50 to be positioned at a desired location within a target data track 68.

With reference to FIGS. 10 and 12, the rotation of the piezoelectric motor 60 is made possible by the provision of the G-shaped narrow gaps 84 and 86, which allow a sufficient clearance between the rectangular tabs 140 and 142 and the main body of the flexure tongue 48. During the rotation of the piezoelectric motor 60, the rectangular tabs 140 and 142 that are attached to the two hinges 144 and 146, also rotate in unison with the piezoelectric motor 60. Thus, the narrow gaps 84 and 86 are so designed in order to enable the piezoelectric motor 60 to execute a full stroke during its rotation without causing a physical interference or binding of the moving rectangular tabs 140 and 142 with the stationary flexure tongue 48.

The rotational motion of the piezoelectric motor 60 offers a number of significant advantages over other microactuator designs. Because the actuation of the read/write head 35 does not involve a flexural (bending) deflection of the piezoelectric motor 60, a significant gain in the frequency response characteristics of the read/write head 35 is thus realized by typically higher natural frequencies of the piezoelectric motor 60 associated with a pure extensional deflection rather than with a flexural deflection.

The increase in frequency response therefore enables a faster response time due to external disturbances during a track-follow control operation, chiefly due to the ability for the track-follow control to command a greater input force without a concern for mechanically exciting any low frequency flexural modes of the piezoelectric motor 60. Thus, a significant enhancement in the performance of the track-follow control is obtained with the use of the piezoelectric motor 60 of the present invention.

Another significant advantage of the present invention lies in the rotational motion of the piezoelectric motor 60. Because the resultant torque is derived from the force couple which is comprised of two forces 150, 152 of equal amplitude acting in opposite directions, there is no net force acting in any direction on the flexure 40 or the load beam 36 to which the flexure 40 is attached, other than the resultant torque.

The absence of the net force acting on the load beam 36 effectively prevents mechanical excitation of vibration modes of the load beam 36 in the low frequency range. The microactuator excited frequency response of the servo system (VCM 20, suspension 33, and collocated microactuator 60) is reduced to the yaw mode frequency of the microactuator assembly, which is approximately 18,000 Hz for a preferred embodiment. This allows the bandwidth of the close-looped control system for secondary fine positioning of read/write head could be at least 3 kHz, and therefore suitable for track following control of extremely high track per inch (TPI), for example greater than 100 KTPI hard disk drives.

The simplicity in the microactuator design of the piezoelectric motor 60 is highly conducive to a high-volume, low-cost production as a result of a simplified manufacturing process. This simplicity is demonstrated by the use of a single monolithic block in the piezoelectric motor 60. Furthermore, because the flexure tongue 48 incorporates all the necessary patterned features, the piezoelectric motor 60 is not designed with any specialized patterning technology, as opposed to some microactuator designs that rely on patterning piezoelectric motors. Because the patterning technology used in piezoelectric material process has not sufficiently developed into a maturity, the manufacturing cost associated with those microactuator designs that rely on such a technology is typically much greater than that for the microactuator design using the piezoelectric motor 60.

As described earlier, in the referred embodiment, the flexure tongue 48 includes the two hinges 144 and 146 that are generally directed towards the center of rotation C and offset by a small offset distance 148. Alternatively, the flexure tongue 48 may include a different hinge configuration that achieves the same or similar objective, as it will now be described in connection with FIG. 13.

Figure 13:
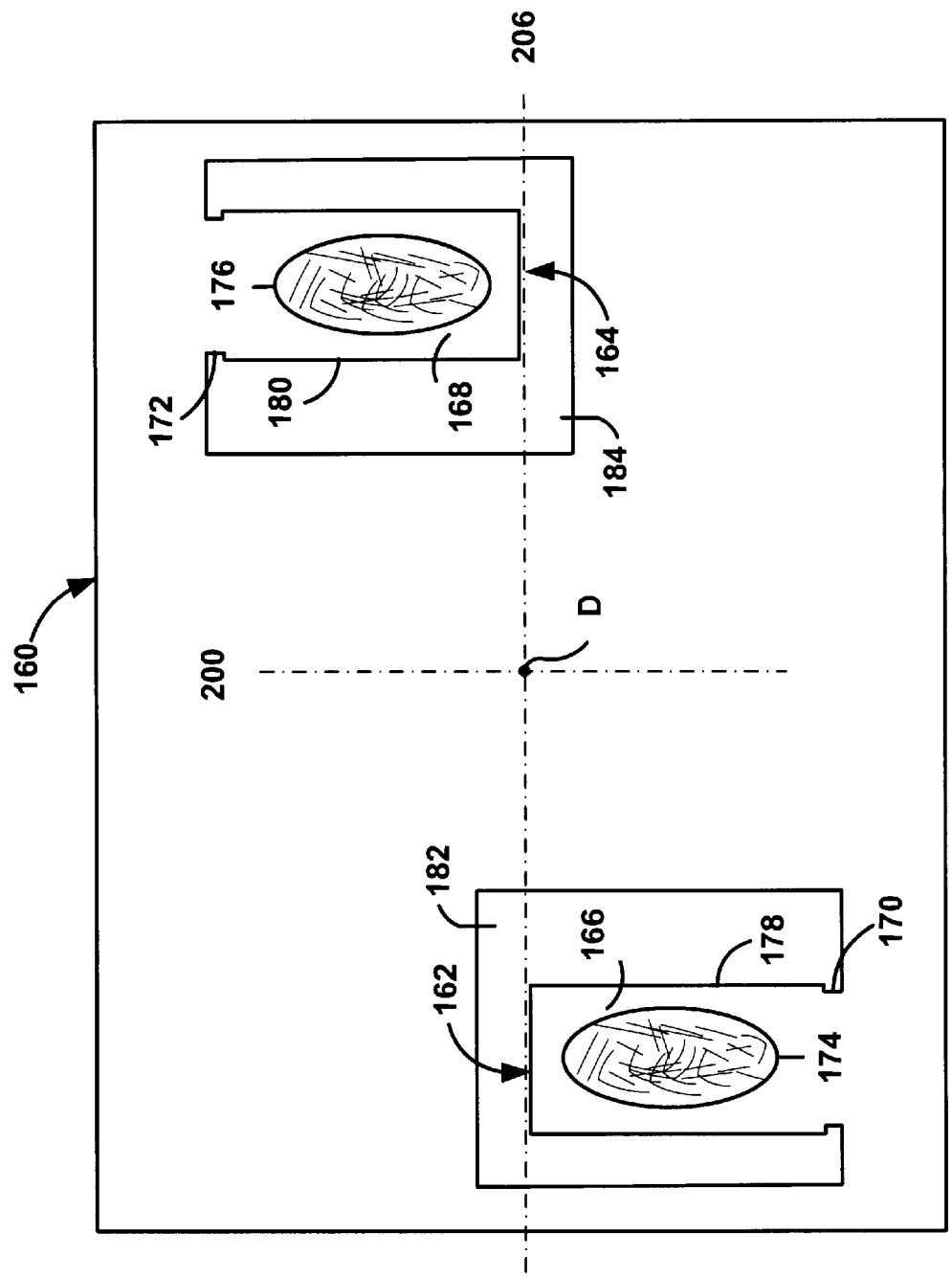
FIG. 13 is an ABS view of the flexure tongue of the head gimbal assembly of FIG. 2 with a different hinge configuration, according to an alternative embodiment of the present invention.

Referring now to FIG. 13, it illustrates a flexure tongue 160 that is made according to an alternative embodiment of the present invention. The flexure tongue 160 is formed on the flexure 40 and includes two hinged islands 162 and 164 that are enclosed by two narrow gaps 182 and 184, respectively. The hinged islands 162 and 164 are further defined by two rectangular tabs 166 and 168, and two hinges 170 and 172, respectively. It should be understood that while the tabs 166 and 168 are described as being rectangularly shaped, they can assume alternative shapes.

The rectangular tabs 166 and 168 are generally disposed along the transverse axis 200, and are preferably similar in shape. The tabs 166 and 168 provide bonding surfaces for attaching the piezoelectric motor 60 by means of adhesive.

The lengths of the tabs 166 and 168 are generally oriented along the transverse direction 200 of the flexure 40. Each of the tabs 166 and 168 has a length of approximately 0.4 mm and a width of approximately 0.3 mm. The rectangular tabs 166 and 168 are further separated by a distance of approximately 0.25 mm between their respective inner edges 178 and 180.

The two hinges 170 and 172 are formed of thin, short substantially rectangular sections that are attached to the rectangular tabs 166 and 168. The two hinges 170 and 172 are separated by a substantial offset along the transverse direction 200 of the flexure 40. The offset is the distance between the transverse axes of the two hinges 170, 172 or the two tabs 166, 168. Alternatively, the offset can be measured as a function of the distance between the inner edges 178 and 180 of the tabs 166, 168, respectively.

The functionality of the alternative embodiment of FIG. 11 is similar to that of the preferred embodiment described earlier, in that the elongation or contraction of the piezoelectric motor 60 causes the two offsetting hinges 170 and 172 to deflect, inducing a resultant torque to develop. In turn, the resultant torque actuates the piezoelectric motor 60 and the slider 47 to displace rotationally about the center D of the flexure tongue 160.

Figure 14A:
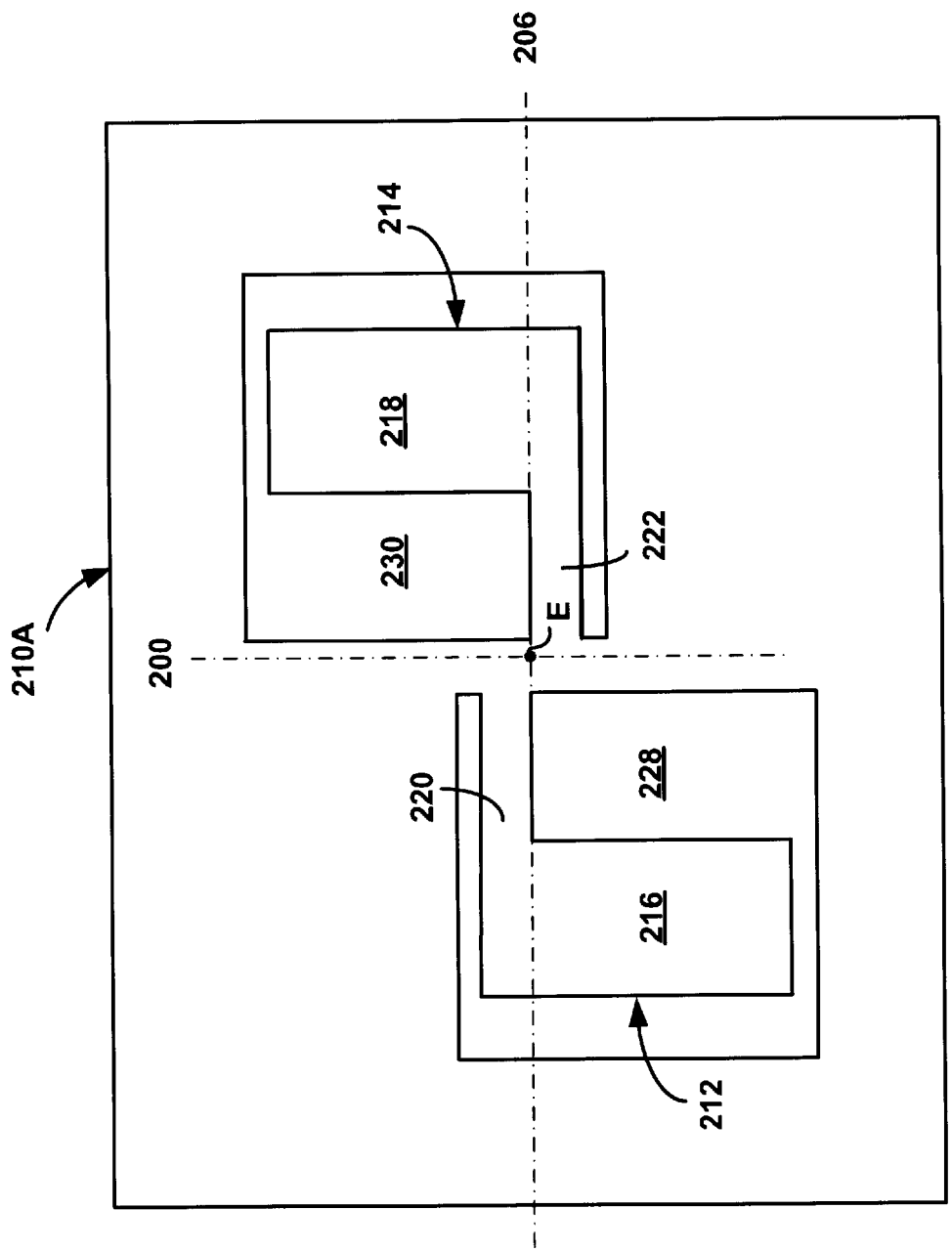
FIG. 14 is comprised of FIGS. 14A and 14B that illustrate two of the flexure tongue of the head gimbal assembly of FIG. 2 with different hinge configurations, according to other alternate embodiments of the present invention;.
Figure 14B:
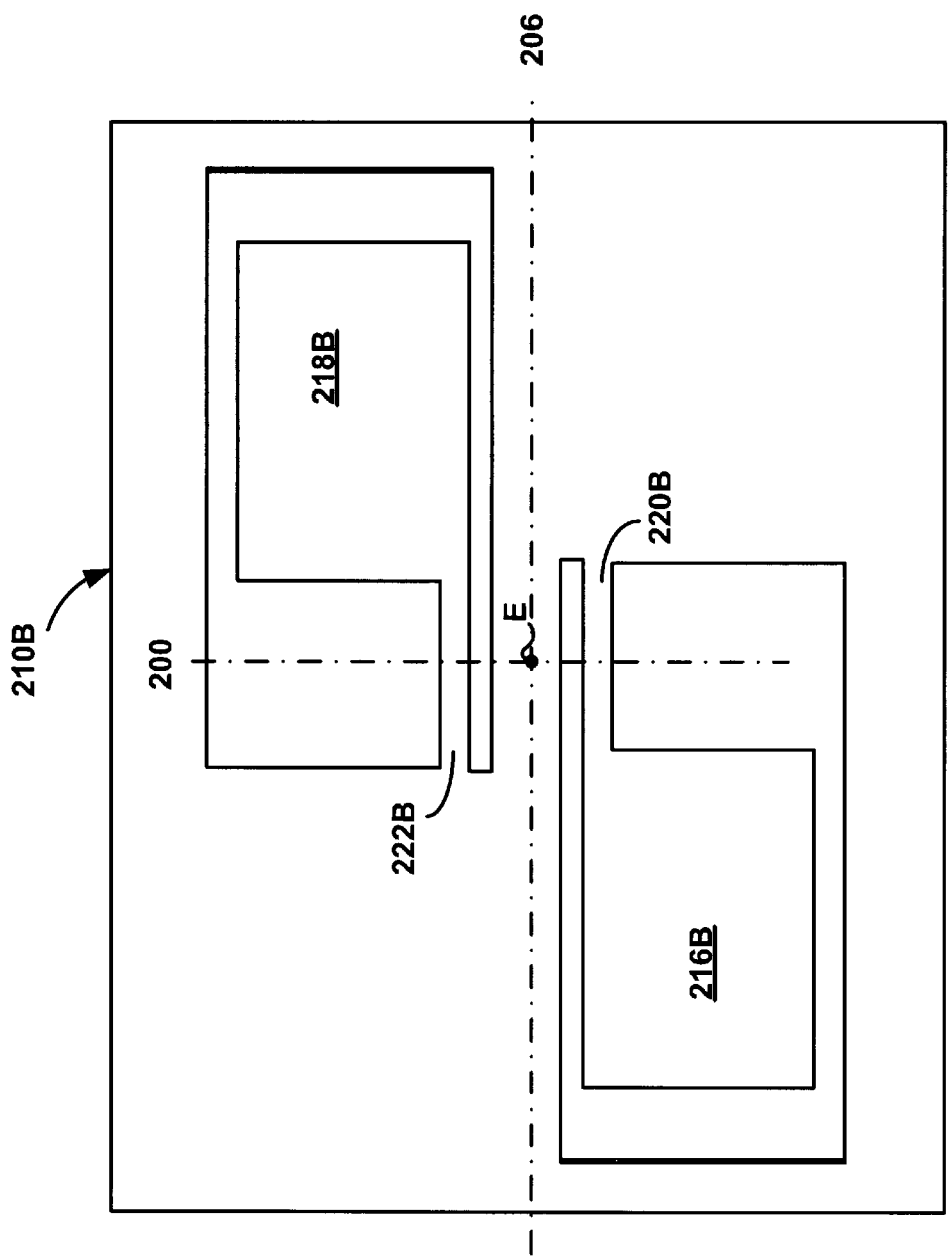

The piezoelectric motor 60 may be positioned onto another flexure tongue 210A made according to other alternative embodiments of the present invention, as illustrated in FIGS. 14A and 14B. The flexure tongue 210A is generally comprised of two hinged islands 212 and 214 that are enclosed by two narrow gaps 228 and 230. The hinged islands 212 and 214 further include two rectangular tabs 216 and 218, and two hinges 220 and 222, respectively.

The tabs 216 and 218 are generally disposed along the transverse axis 200 and provide bonding surfaces for attaching the piezoelectric motor 60 by means of adhesive pads. The two hinges 220 and 222 are short rectangular sections that connect the rectangular tabs 216 and 218 to the main body of the flexure tongue 210A. Further, the two hinges 220 and 222 are separated by an offset distance in the transverse direction 200 of the flexure 40. By relying on the two offset hinges 220 and 222 for generating a torque to cause a rotation of the flexure tongue 210A, this alternative embodiment is therefore functionally equivalent (or similar) to those of the preferred and alternative embodiments described herein.

FIG. 14B represents a variation of the flexure tongue 210A of FIG. 14A, wherein the alternative flexure tongue 210B is formed of two rectangularly shaped tabs 216B and 218B that are generally disposed along the axis 206 and provide bonding surfaces for attaching the piezoelectric motor 60 by means of adhesive pads.

The two hinges 220B and 222B of the flexure tongue 210B are short rectangular sections that connect the rectangular tabs 216B and 218B to the main body of the flexure tongue 210B. Further, the two hinges 220B and 222B are separated by an offset distance along the axis 206 of the flexure 40.

While the foregoing preferred and alternative embodiments demonstrate an enhanced microactuator design using a monolithic single piezoelectric motor 60 for a track-follow control actuation, it is also possible to replace the single piezoelectric motor 60 by two piezo motors 250 and 252 as it will be described in connection with FIG. 15.

Figure 15:
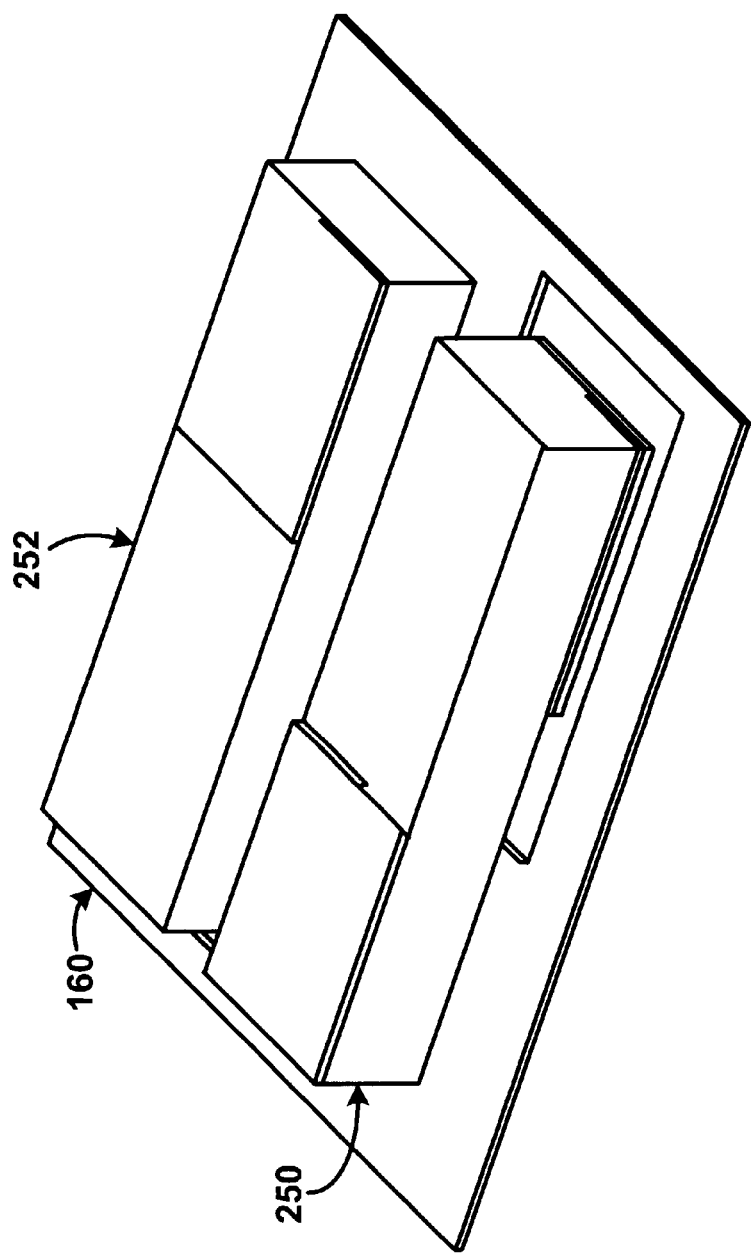
FIG. 15 is a perspective of the flexure tongue of the head gimbal assembly of FIG. 2 that includes two piezoelectric motors attached to a flexure tongue of an embodiment described herein, according to an alternative embodiment of the present invention.

FIG. 15 illustrates yet another alternate embodiment that includes two piezoelectric motors 250 and 252 positioned on, for example, the flexure tongue 160 of FIG. 13. Each of the two piezo motors 250 and 252 is attached to one of the rectangular tabs 166 and 168 by means of the adhesive pads 174 and 176. The two piezo motors 250 and 252 are positioned parallel to each other and oriented lengthwise along the longitudinal axis 206 of the flexure 40. The slider 47 is then bonded to the two piezo motors 250 and 252 by means of adhesive pads. Each of the two piezoelectric motors 250 and 252 is connected to a separate voltage source for independent control.

During actuation, two, preferably, but not necessarily, equal voltages of the same polarity are applied to energize the piezoelectric motors 250 and 252, causing them to either elongate or contract in accordance with the voltage polarity, by an equal amount. As in the case with the foregoing embodiments, the elongations or contractions of the two piezoelectric motors 250 and 252 of this alternative embodiment causes the two offsetting hinges 170 and 172 to deflect, inducing a torque that promotes the rotation of the slider 47 attached to the two piezo motors 250 and 252 about the center D (FIG. 13) of the flexure tongue 160.

According to yet another embodiment of the present invention, the rectangular tabs may be oriented lengthwise along the longitudinal axis 206 of the flexure 40. The two piezoelectric motors 250 and 252 may be oriented along any desirable angle relative to the transverse axis 200 of the flexure 40.

Figure 16:
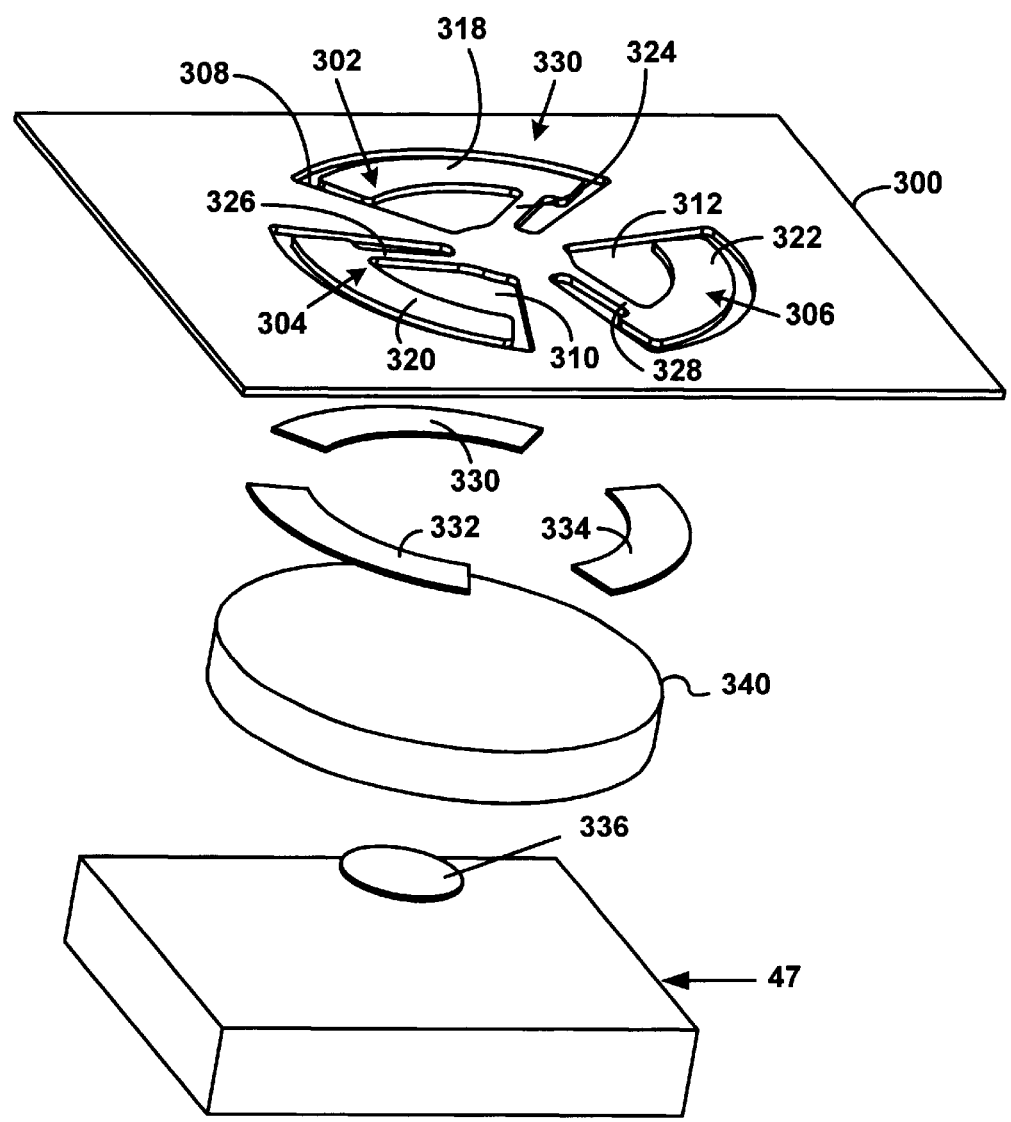
FIG. 16 is a perspective view of multiple piezoelectric motors bonded to the flexure tongue in a circumferential configuration, according to an alternative embodiment of the present invention.
Figure 17:
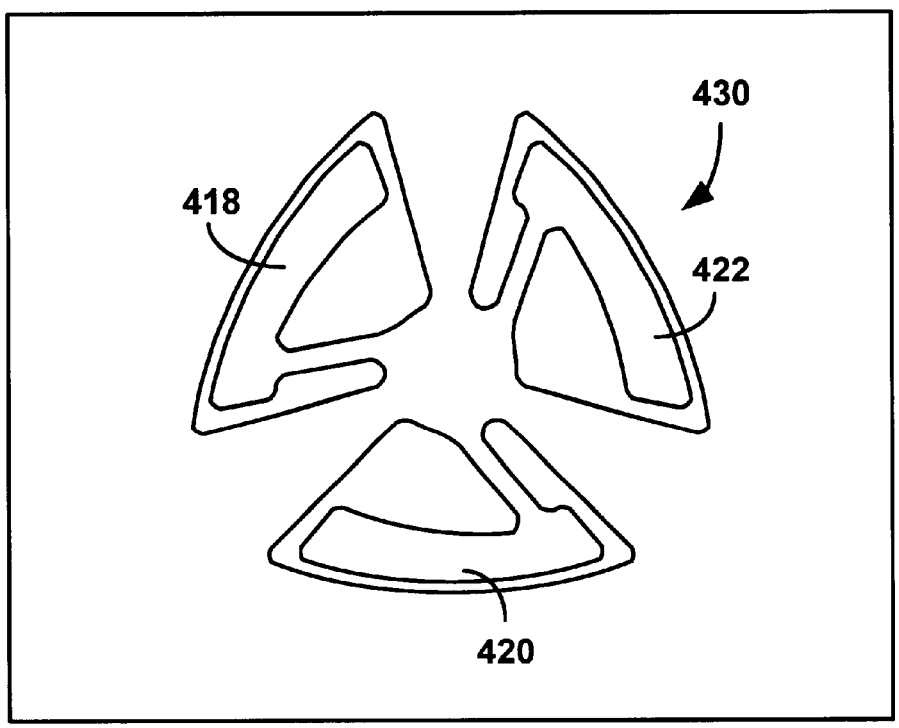
FIG. 17 is a bottom view of a flexure tongue that is an alternative variation of the flexure tongue of FIG. 16.

The novelty of the offsetting hinges of the present invention may now be applied to a design of substantial departure from the foregoing embodiments. Referring now to FIGS. 16 and 17, they illustrate yet another alternative embodiment of the present invention, according to which a flexure tongue 300 is comprised of a centrally positioned circular feature 330 having a plurality (i.e., two or more) hinged islands to which a circularly-shaped piezoelectric motor 340 is attached. For clarity, only three such hinged islands 302, 304, 306 are shown in FIGS. 16 and 17.

With reference to FIG. 16, the three hinged islands 302, 304, 306 are respectively positioned inside three opening sectors 308, 310, 312 that are equally spaced circumferentially, in a circular disposition. The inner and outer edges of the three opening sectors 308, 310, and 312 define a concentric inner circle and a concentric outer circle, which delineate the circular feature 330 from the main body of the flexure tongue 300.

Each of the three hinged islands 302, 304, 306 is comprised of a corresponding constant-width arc (or arcuate) segment 318, 320, 322, and a corresponding hinge 324, 326, 328, respectively. The arc segments 318, 320, 322 are positioned radially inwards and are separated from the outer circle 316 by a small radius difference of about 0.05 mm.

The piezoelectric motor 340 is formed of a monolithic block of a circular shape having a radius at least the same or greater than that of the outer circle of arc segments 318, 320, 322. Further, the piezoelectric motor 340 is bonded on one side to the arc segments 318, 320, 322 by means of three adhesive pads 330, 332, 334 affixed therebetween, and on the other side to the slider 47 by means of a centrally positioned adhesive pad 336.

The three hinges 324, 326, 328 connect the respective arc segments 318, 320, 322 at one of their inner corners to the inner circle 314 in such a manner that the axes 338, 340, 342 along the lengths of the three respective hinges 324, 326, 328 do not pass through the center of the inner circle 314 or the outer circle 316. This configuration is referred to herein as radially offsetting hinges.

This alternative embodiment operates generally on the same working principle as the foregoing embodiments. As a voltage source is supplied to the piezoelectric motor 340, causing it to expand or contract radially. The expansion or contraction of the piezoelectric motor 340 causes the three hinges 324, 326, and 328 to deflect, thus exerting an axial force directed non-radially outward or inward. Thus, the three axial forces developed within the three hinges 324, 326, 328 collectively form a force couple acting on the piezoelectric motor 340 as a resultant torque.

For an expansion of the piezoelectric motor 340, the resultant torque acts clockwise on the piezoelectric motor 340 to cause it to displace rotationally in the same sense. The converse is true for a contraction of the piezoelectric motor 340. The rotation of the piezoelectric motor 340 hence causes the attached slider 47 to rotate conformally to position the read/write head 35 accurately during a track-follow control actuation.

FIG. 17 is a bottom view of a flexure tongue 400 that is a variation of the flexure tongue 300 of FIG. 16. The flexure tongue 400 is similar in construction, design, and function to those of the flexure tongue 300, with the exception that the flexure tongue 400 illustrates the concept that the feature 430, that corresponds to the feature 330 of FIG. 16 does not follow a circular configuration, but rather a different circumferential form, wherein the arc segments 418, 420, 422 are not circular arcs.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment. As an example, while the various motors have been described herein to be comprised of piezoelectric material, it should be clear that other active materials, such as, electrostrictive material, memory alloy, smart material, and so forth, could alternatively be employed.

What is claimed is:

1. A microactuator for use in a data storage device that includes a slider, comprising:
   a resilient hinged mounting structure;
   a motor comprising a top side and an underside, that moves rotationally about a center of rotation, to perform fine positioning movement when a control voltage is applied to the motor;
   the top side of the motor is secured to the hinged mounting structure;
   the underside of the motor is secured to the slider;
   wherein the motor includes a piezoelectric motor;
   wherein the hinged mounting surface includes a flexure tongue;
   wherein the flexure tongue includes two hinged islands;
   wherein a first hinged island comprises a first pad and a first hinge;
   wherein a second hinged island comprises a second pad and a second hinge; and
   wherein the first pad and the second pad are offset along a transverse axis by on offset distance.

2. A microactuator for use in a data storage device that includes a slider, comprising:
   a resilient hinged mounting structure;
   a motor comprising a top side and an underside, that moves rotationally about a center of rotation, to perform fine positioning movement when a control voltage is applied to the motor;
   the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the first pad and the second pad are offset along a longitudinal axis by on offset distance.

3. A microactuator for use in a data storage device that includes a slider, comprising:

a resilient hinged mounting structure;

a motor comprising a top side and an underside, that moves rotationally about a center of rotation, to perform fine positioning movement when a control voltage is applied to the motor;

the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the first hinge and the second hinge are offset along a transverse axis by on offset distance.

4. A microactuator for use in a data storage device that includes a slider, comprising:

a resilient hinged mounting structure;

a motor comprising a top side and an underside, that moves rotationally about a center of rotation, to perform fine positioning movement when a control voltage is applied to the motor;

the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the first hinge and the second hinge are offset along a longitudinal axis by an offset distance.

5. A microactuator for use in a data storage device that includes a slider, comprising:

a resilient hinged mounting structure;

a motor comprising a top side and an underside, that moves rotationally about a center of rotation, to perform fine positioning movement when a control voltage is applied to the motor;

the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the top side of the motor is secured to the first pad and the second pad.

6. The microactuator of claim 5, wherein the motor is oriented along a longitudinal axis of the flexure tongue.

7. The microactuator of claim 5, wherein the motor is oriented along a transverse axis of the flexure tongue.

8. A microactuator for use in a data storage device that includes a slider, comprising:

a resilient hinged mounting structure;

a motor comprising a top side and an underside, that moves rotationally about a center of rotation, to perform fine positioning movement when a control voltage is applied to the motor;

the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the control voltage causes the first pad and the second pad to expand, and the first hinge and the second hinge to deflect, so as to generate a torque about the center of rotation, causing the piezoelectric motor and the slider to displace in any of a clockwise direction or a counterclockwise rotation.

9. A microactuator for use in a data storage device that includes a slider, comprising:

a resilient hinged mounting structure;

a motor comprising a top side and an underside, that moves rotationally about a center of rotation, to perform fine positioning movement when a control voltage is applied to the motor, the top side of the motor is secured to the hinged mounting structure;

the underside of the motor is secured to the slider;

wherein the motor includes a piezoelectric motor;

wherein the hinged mounting surface includes a flexure tongue;

wherein the flexure tongue includes two hinged islands;

wherein a first hinged island comprises a first pad and a first hinge;

wherein a second hinged island comprises a second pad and a second hinge; and wherein the control voltage causes the first pad and the second pad to contract, and the first hinge and the second hinge to deflect, so as to generate a torque about the center of rotation, causing the piezoelectric motor and the slider to displace in any of a clockwise direction or a counterclockwise rotation.

10. A microactuator for use in a data storage device that includes a slider, comprising:
  a resilient hinged mounting structure;
  a motor comprising a top side and an underside, that moves rotationally about a center of rotation, to perform fine positioning movement when a control voltage is applied to the motor;
  the top side of the motor is secured to the hinged mounting structure;
  the underside of the motor is secured to the slider;
  wherein the hinged mounting surface includes a flexure tongue;
  wherein the flexure tongue includes two hinged islands;
  wherein a first hinged island comprises a first pad and a first hinge;
  wherein a second hinged island comprises a second pad and a second hinge; and
  wherein the motor comprises two piezoelectric motors;
  wherein a first piezoelectric motor is secured to the first pad; and
  wherein a second piezoelectric motor is secured to the second pad.

11. A microactuator for use in a data storage device that includes a slider, comprising:
  a resilient hinged mounting structure;
  a motor comprising a top side and on underside, that moves rotationally about a center of rotation, to perform fine positioning movement when a control voltage is applied to the motor;
  the top side of the motor is secured to the hinged mounting structure;
  the underside of the motor is secured to the slider;
  wherein the hinged mounting surface comprises a plurality of piezoelectric motors that are arranged in a circumferential configuration;
  wherein the plurality of piezoelectric motors comprise a corresponding plurality of force centers; and
  wherein the plurality of force centers are offset from the center of rotation to import a rotational movement to the actuator.

12. A read/write head for use in a data storage device that includes a slider, comprising:
  an arm; and
  a microactuator secured to the arm and comprising:
    a resilient hinged mounting structure;
    a motor comprising a top side and an underside, that moves rotationally about a center of rotation, to perform fine positioning movement when a control voltage is applied to the motor;
    the top side of the motor is secured to the hinged mounting structure; and
    the underside of the motor is secured to the slider;
    wherein the motor includes a piezoelectric motor;
    wherein the hinged mounting surface includes a flexure tongue;
    wherein the flexure tongue includes two hinged islands;
    wherein a first hinged island comprises a first pad and a first hinge;
    wherein a second hinged island comprises a second pad and a second hinge; and
    wherein the top side of the motor is secured to the first pad and the second pad.

13. The read/write head of claim 12, wherein the motor is oriented along a longitudinal axis of the flexure tongue.

14. The read/write head of claim 12, wherein the motor is oriented along a transverse axis of the flexure tongue.

15. A microactuator, comprising:
  a hinged mounting structure that includes at least two hinged islands;
  a motor;
  wherein the motor is secured to the two hinged islands, so that the microactuator moves rotationally about a center of rotation, to perform fine rotational movement when a control voltage is applied to the motor;
  wherein a first hinged island comprises a first pad and a first hinge;
  wherein a second hinged island comprises a second pad and a second hinge; and
  wherein the first pad and the second pad are offset along any of a transverse axis or a longitudinal axis, by an offset distance.

16. A microactuator, comprising:
  a hinged mounting structure that includes at least two hinged islands:
  a motor;
  wherein the motor is secured to the two hinged islands, so that the microactuator moves rotationally about a center of rotation, to perform fine rotational movement when a control voltage is applied to the motor;
  wherein a first hinged island comprises a first pad and a first hinge;
  wherein a second hinged island comprises a second pad and a second hinge; and
  wherein the first hinge and the second hinge are offset along any of a transverse axis or a longitudinal axis.

17. A microactuator, comprising:
  a hinged mounting structure that includes at least two hinged islands;
  a motor;
  wherein the motor is secured to the two hinged islands, so that the microactuator moves rotationally about a center of rotation, to perform fine rotational movement when a control voltage is applied to the motor;
  wherein a first hinged island comprises a first pad and a first hinge;
  wherein a second hinged island comprises a second pad and a second hinge;
  wherein the motor is formed of any of on electrostrictive material or a memory alloy;
  wherein the motor includes a piezoelectric motor; and
  wherein the control voltage causes the first pad and the second pad to expand, and the first hinge and the second hinge to deflect, so as to generate a torque about the center of rotation, causing the piezoelectric motor and the slider to displace in any of a clockwise direction or a counterclockwise rotation.

18. A microactuator, comprising:
  a hinged mounting structure that includes at least two hinged islands;
  a motor;
  wherein the motor is secured to the two hinged islands, so that the microactuator moves rotationally about a center of rotation, to perform fine rotational movement when a control voltage is applied to the motor;
  wherein a first hinged island corn rises a first pad and a first hinge;
  wherein a second hinged island comprises a second pad and a second hinge;

wherein the motor is formed of any of an electrostrictive material or a memory alloy;
wherein the motor includes a piezoelectric motor; and
wherein the control voltage causes the first pad and the second pad to contract, and the first hinge and the second hinge to deflect, so as to generate a torque about the center of rotation, causing the piezoelectric motor and the slider to displace in any of a clockwise direction or a counterclockwise rotation.

19. A microactuator, comprising:
a hinged mounting structure that includes at least two hinged islands;
a motor;
wherein the motor is secured to the two hinged islands, so that the microactuator moves rotationally about a center of rotation, to perform fine rotational movement when a control voltage is applied to the motor;
wherein a first hinged island comprises a first pad and a first hinge;
wherein a second hinged island comprises a second pad and a second hinge;
wherein the motor comprises two piezoelectric motors;
wherein a first piezoelectric motor is secured to the first pad; and
wherein a second piezoelectric motor is secured to the second pad.

20. A read/write head for use in a data storage device that includes a slider, comprising:
an arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;
wherein a first hinged island comprises a first pad and a first hinge;
wherein a second hinged island comprises a second pad and a second hinge; and
wherein the first pad and the second pad are offset along a transverse axis by an offset distance.

21. A read/write head for use in a data storage device that includes a slider, comprising:
an arm; and
a microactuator secured to the arm and comprising;
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;
wherein a first hinged island comprises a first pad and a first hinge;
wherein a second hinged island comprises a second pad and a second hinge; and
wherein the first pad and the second pad are offset along a longitudinal axis by an offset distance.

22. A read/write head for use in a data storage device that includes a slider, comprising:
an arm; and
a microactuator secured to the arm and comprising:
a resilient hinged mounting structure;
a motor comprising a top side and on underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;
wherein a first hinged island comprises a first pad and a first hinge;
wherein e second hinged island comprises a second pad and a second hinge; and
wherein the first hinge and the second hinge ore offset along a transverse axis by on offset distance.

23. A read/write head for use in a data storage device that includes a slider, comprising:
an arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;
wherein a first hinged island comprises a first pad and a first hinge;
wherein a second hinged island comprises a second pad and a second hinge; and
wherein the first hinge and the second hinge are offset along a longitudinal axis by an offset distance.

24. A read/write head for use in a data storage device that includes a slider, comprising:
on arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;

wherein a first hinged island comprises a first pad and a first hinge;
wherein a second hinged island comprises a second pad and a second hinge; and
wherein the control voltage causes the first pad and the second pad to expand, and the first hinge and the second hinge to deflect, so as to generate a torque about the center of rotation, causing the piezoelectric motor and the slider to displace in any of a clockwise direction or a counterclockwise rotation.

25. A read/write head for use in a data storage device that includes a slider, comprising:
an arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the motor includes a piezoelectric motor;
wherein the hinged mounting surface includes a flexure tongue;
wherein the flexure tongue includes two hinged islands;
wherein a first hinged island comprises a first pad and a first hinge;
wherein a second hinged island comprises a second pad and a second hinge; and
wherein the control voltage causes the first pad and the second pad to contract, and the first hinge and the second hinge to deflect, so as to generate a torque about the center of rotation, causing the piezoelectric motor and the slider to displace in any of a clockwise direction or a counterclockwise rotation.

26. A read/write head for use in a data storage device that includes a slider, comprising:
an arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the hinged mounting surface includes a flexure tongue;
wherein the flexure tongue includes two hinged islands;
wherein a first hinged island comprises a first pad and a first hinge;
wherein a second hinged island comprises a second pad and a second hinge;
wherein the motor comprises two piezoelectric motors;
wherein a first piezoelectric motor is secured to the first pad; and
wherein a second piezoelectric motor is secured to the second pad.

27. A read/write head for use in a data storage device that includes a slider, comprising:
an arm; and
a microactuator secured to the arm and comprising:
a resilient hinged mounting structure;
a motor comprising a top side and an underside, that moves rotationally about a center of rotation, to perform fine positioning movement when a control voltage is applied to the motor;
the top side of the motor is secured to the hinged mounting structure;
the underside of the motor is secured to the slider;
wherein the hinged mounting surface comprises a plurality of piezoelectric motors that are arranged in a circumferential configuration;
wherein the plurality of piezoelectric motors comprise a corresponding plurality of force centers; and
wherein the plurality of force centers are offset from the center of rotation to impart a rotational movement to the actuator.

28. A read/write head for use in a data storage device that includes a slider, comprising:
an arm; and
a microactuator secured to the arm and comprising:
a hinged mounting structure that includes at least two hinged islands;
a motor;
wherein the motor is secured to the two hinged islands, so that the microactuator moves rotationally about a center of rotation, to perform fine rotational movement when a control voltage is applied to the motor;
wherein a first hinged island comprises a first pad and a first hinge;
wherein a second hinged island comprises a second pad and a second hinge; and
wherein the first pad and the second pad are offset along any of a transverse axis or a longitudinal axis, by an offset distance.

29. A read/write head for use in a data storage device that includes a slider, comprising:
an arm; and
a microactuator secured to the arm and comprising:
a hinged mounting structure that includes at least two hinged islands;
a motor;
wherein the motor is secured to the two hinged islands, so that the microactuator moves rotationally about a center of rotation, to perform fine rotational movement when a control voltage is applied to the motor;
wherein a first hinged island comprises a first pad and a first hinge;
wherein a second hinged island comprises a second pad and a second hinge; and
wherein the first hinge and the second hinge are offset along any of a transverse axis or a longitudinal axis.

30. A read/write head for use in a data storage device that includes a slider, comprising:
an arm; and
a microactuator secured to the arm and comprising:
a hinged mounting structure that includes at least two hinged islands;
a motor;
wherein the motor is secured to the two hinged islands, so that the microactuator moves rotationally about a center of rotation, to perform fine rotational movement when a control voltage is applied to the motor;
wherein a first hinged island comprises a first pad and a first hinge;
wherein a second hinged island comprises a second pad and a second hinge; and
wherein the motor is oriented along any of a longitudinal axis or a transverse axis of the flexure tongue.

31. A read/write head for use in a data storage device that includes a slider, comprising:

an arm; and a microactuator secured to the arm and comprising:
- a hinged mounting structure that includes at least two hinged islands;
- a motor;
- wherein the motor is secured to the two hinged islands, so that the microactuator moves rotationally about a center of rotation, to perform fine rotational movement when a control voltage is applied to the motor;
- wherein a first hinged island comprises a first pad and a first hinge;
- wherein a second hinged island comprises a second pad and a second hinge;
- wherein the motor is formed of any of an electrostrictive material or a memory alloy;
- wherein the motor includes a piezoelectric motor; and
- wherein the control voltage causes the first pad and the second pad to expand, and the first hinge and the second hinge to deflect, so as to generate a torque about the center of rotation, causing the piezoelectric motor and the slider to displace in any of a clockwise direction or a counterclockwise rotation.

32. A read/write head for use in a data storage device that includes a slider, comprising:

an arm and a microactuator secured to the arm and comprising:
- a hinged mounting structure that includes at least two hinged islands;
- a motor;
- wherein the motor is secured to the two hinged islands, so that the microactuator moves rotationally about a center of rotation, to perform fine rotational movement when a control voltage is applied to the motor;
- wherein a first hinged island comprises a first pad and a first hinge;
- wherein a second hinged island comprises a second pad and a second hinge;
- wherein the motor is formed of any of an electrostrictive material or a memory alloy;
- wherein the motor includes a piezoelectric motor; and
- wherein the control voltage causes the first pad and the second pad to contract, and the first hinge and the second hinge to deflect, so as to generate a torque about the center of rotation, causing the piezoelectric motor and the slider to displace in any of a clockwise direction or a counterclockwise rotation.

33. A read/write head for use in a data storage device that includes a slider, comprising:

an arm; and a microactuator secured to the arm and comprising:
- a hinged mounting structure that includes at least two hinged islands;
- a motor;
- wherein the motor is secured to the two hinged islands, so that the microactuator moves rotationally about a center of rotation, to perform fine rotational movement when a control voltage is applied to the motor;
- wherein a first hinged island comprises a first pad and a first hinge;
- wherein a second hinged island comprises a second pad and a second hinge;
- wherein the motor comprises two piezoelectric motors;
- wherein a first piezoelectric motor is secured to the first pad; and
- wherein a second piezoelectric motor is secured to the second pad.

* * * * *